United States Patent
Chun et al.

(10) Patent No.: US 11,032,577 B2
(45) Date of Patent: Jun. 8, 2021

(54) ELECTRONIC DEVICE FOR COMPRESSING IMAGE BASED ON COMPRESSION LOSS DATA RELATED TO COMPRESSION OF MULTIPLE BLOCKS, WHICH ARE SEGMENTS OF THE IMAGE, AND METHOD FOR OPERATING THE SAME

(71) Applicant: Samsung Electronics Co., Ltd., Gyeonggi-do (KR)

(72) Inventors: Hyungju Chun, Gyeonggi-do (KR); Sungoh Kim, Gyeonggi-do (KR); Youngjo Kim, Gyeonggi-do (KR); Hyunhee Park, Gyeonggi-do (KR); Arang Lee, Gyeonggi-do (KR); Jongbum Choi, Gyeonggi-do (KR); Changsu Han, Gyeonggi-do (KR); Hajoong Park, Gyeonggi-do (KR); Donghyun Yeom, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 292 days.

(21) Appl. No.: 16/282,707

(22) Filed: Feb. 22, 2019

(65) Prior Publication Data
US 2019/0266756 A1    Aug. 29, 2019

(30) Foreign Application Priority Data
Feb. 23, 2018    (KR) .................. 10-2018-0022258

(51) Int. Cl.
*H04N 19/87*    (2014.01)
*H04N 19/115*    (2014.01)
(Continued)

(52) U.S. Cl.
CPC ............. *H04N 19/87* (2014.11); *H04N 19/00* (2013.01); *H04N 19/115* (2014.11);
(Continued)

(58) Field of Classification Search
CPC . G06T 2207/10016; G06T 2207/20224; G06T 7/11; G06T 9/00; H04N 19/00;
(Continued)

(56) References Cited

U.S. PATENT DOCUMENTS 7,733,954 B2    6/2010    Alexandre et al.
9,185,424 B2 *  11/2015   Teng ................... H04N 19/124
(Continued)

FOREIGN PATENT DOCUMENTS

KR    10-2012-0118283 A    10/2012

OTHER PUBLICATIONS

International Search Report dated Jun. 11, 2019.

*Primary Examiner* — Mohammed S Rahaman
(74) *Attorney, Agent, or Firm* — Cha & Reiter, LLC.

(57) ABSTRACT

According to an embodiment, a method may include segmenting a first image into a first block and a second block, generating first compression loss data corresponding to the first block and second compression loss data corresponding to the second block, identifying a first compression property, segmenting a second image into a third block and a fourth block and compressing the second image, wherein the compressing includes compressing the third block according to the first compression property, generating third compression loss data corresponding to the third block, when a difference between the first compression loss data and the third compression loss data meets a first predetermined condition, compressing the fourth block according to the first compression property, and when the difference meets a second predetermined condition, compressing the fourth block according to a second compression property. Other various embodiments are possible as well.

20 Claims, 17 Drawing Sheets

(51) Int. Cl.

| | |
|---|---|
| *H04N 19/146* | (2014.01) |
| *H04N 19/142* | (2014.01) |
| *H04N 19/14* | (2014.01) |
| *H04N 19/176* | (2014.01) |
| *H04N 19/00* | (2014.01) |
| *G06T 9/00* | (2006.01) |
| *G06T 7/11* | (2017.01) |
| *H04N 5/235* | (2006.01) |

(52) U.S. Cl.
CPC ........... *H04N 19/14* (2014.11); *H04N 19/142* (2014.11); *H04N 19/146* (2014.11); *H04N 19/176* (2014.11); *G06T 7/11* (2017.01); *G06T 9/00* (2013.01); *G06T 2207/10016* (2013.01); *G06T 2207/20224* (2013.01); *H04N 5/2351* (2013.01)

(58) Field of Classification Search
CPC .... H04N 19/115; H04N 19/14; H04N 19/142; H04N 19/146; H04N 19/176; H04N 19/87; H04N 5/2351
See application file for complete search history.

(56) References Cited

U.S. PATENT DOCUMENTS

| | | |
|---|---|---|
| 2007/0065031 A1 | 3/2007 | Yokose |
| 2010/0027686 A1 | 2/2010 | Zuo et al. |
| 2011/0055441 A1* | 3/2011 | Uchiyama ............... H04N 19/12 710/68 |
| 2017/0078567 A1 | 3/2017 | Ju et al. |
| 2018/0027259 A1* | 1/2018 | Bravo Perez ........ H04N 19/132 375/240.02 |

\* cited by examiner

| IMAGE PATTERN | NAME | PATTERN SIZE (pixels) |
|---|---|---|
| (a)  | Bayer filter | 2x2 |
| (b)  | RGBE filter | 2x2 |
| (c)  | CYYM filter | 2x2 |
| (d)  | CYGM filter | 2x2 |
| (e)  | RGBW Bayer | 2x2 |
| (f)  | RGBW #1 | 4x4 |
| (g)  | RGBW #2 | 4x4 |
| (h)  | RGBW #3 | 2x4 |

ELECTRONIC DEVICE FOR COMPRESSING IMAGE BASED ON COMPRESSION LOSS DATA RELATED TO COMPRESSION OF MULTIPLE BLOCKS, WHICH ARE SEGMENTS OF THE IMAGE, AND METHOD FOR OPERATING THE SAME

CROSS-REFERENCE TO RELATED APPLICATION(S)

This application is based on and claims priority under 35 U.S.C. § 119 to Korean Patent Application No. 10-2018-0022258, filed on Feb. 23, 2018, in the Korean Intellectual Property Office, the disclosure of which is incorporated by reference herein in its entirety.

BACKGROUND

Field

Various embodiments of the present disclosure generally relate to electronic devices configured to compress images based on compression loss data related to the compression of a plurality of blocks, which are segments of the images, and methods for operating the same.

Description of Related Art

Electronic devices that are capable of image processing may obtain raw images through their image sensors and are able to process the obtained raw images using their embedded image signal processors (ISP). The image signal processors may process the received raw images using image quality enhancement algorithms and may thus provide images whose image quality is enhanced. Image processors may perform various types of processing, such as white balancing, color adjustment (e.g., color matrix, color correction, or color enhancement), color filter array interpolation, nose reduction or sharpening, image enhancement such as high-dynamic-range (HDR), face detection, etc. Images output from image signal processors may be in, e.g., the YUV format.

As suggested above, the image sensor of an electronic device may provide an obtained raw image to the processor. For example, the image sensor may provide, to the processor through a mobile industry processor interface (MIPI), Bayer image data that the image sensor has obtained.

The above information is presented as background information only to assist with an understanding of the disclosure. No determination has been made, and no assertion is made, as to whether any of the above might be applicable as prior art with regard to the disclosure.

SUMMARY

The transmission speed of the interface for transferring raw images from the image sensor of the electronic device to the processor may be lower than the speed for transmitting high-quality images. Thus, the image sensor may compress the raw images and transfer the compressed raw images to the processor. According to an embodiment, there may be provided an electronic device for effectively compressing images obtained by an image sensor and for transferring the compressed images to a processor, as well as a method for operating the electronic device.

According to an embodiment, there may be provided an electronic device including an image sensor to compress a current image obtained subsequent to a prior image using compression property information obtained while compressing the prior image.

According to an embodiment, there may be provided an electronic device to identify the difference in complexity between the current image to be compressed and the prior image of the current image based on motion information or image sensor sensitivity (ISO) obtained by the image sensor, and to compress the current image by selectively using the compression property information obtained while compressing the prior image.

According to an embodiment, there may be provided an electronic device to identify the difference in complexity between the current image and the prior image, segment the current image into a plurality of blocks and sequentially compress them, and to compress the current image by selectively using the compression property information obtained while compressing the prior image block.

According to an embodiment, an electronic device may comprise a processor, an image sensor, and a control circuit operatively connected with the image sensor and connected with the processor via a designated interface, the control circuit configured to obtain a first image and a second image subsequent to the first image using the image sensor, segment the first image into a plurality of blocks including a first block and a second block and compress the first image, where in compressing the first image, the control circuit is further configured to generate first compression loss data corresponding to the first block and second compression loss data corresponding to the second block, provide compressed data of the first image corresponding to the first block and the second block to the processor via the designated interface, identify a first compression property based on the first compression loss data and the second compression loss data, segment the second image into a plurality of blocks including a third block and a fourth block that respectively correspond to the first block and the second block and compress the second image, where in compressing the second image, the control circuit is further configured to compress the third block according to the first compression property, generate third compression loss data corresponding to the third block, when a difference between the first compression loss data and the third compression loss data meets a first predetermined condition, compress the fourth block according to the first compression property, and when the difference between the first compression loss data and the third compression loss data meets a second predetermined condition, compress the fourth block according to a second compression property different from the first compression property, and provide compressed data of the second image corresponding to the third block and the fourth block to the processor via the designated interface.

According to an embodiment, a method for operating an electronic device may comprise obtaining a first image and a second image subsequent to the first image using an image sensor, segmenting the first image into a plurality of blocks including a first block and a second block and compressing the first image, where the compressing of the first image includes generating first compression loss data corresponding to the first block and generating second compression loss data corresponding to the second block, providing compressed data of the first image corresponding to the first block and the second block to a processor via a designated interface, identifying a first compression property based on the first compression loss data and the second compression loss data, segmenting the second image into a plurality of blocks including a third block and a fourth block that respectively correspond to the first block and the second block and compressing the second image, where the compressing of the second image includes compressing the third block according to the first compression property, generating third compression loss data corresponding to the third block, when a difference between the first compression loss data and the third compression loss data meets a first predetermined condition, compressing the fourth block according to the first compression property, and when the difference between the first compression loss data and the third compression loss data meets a second predetermined condition, compressing the fourth block according to a second compression property different from the first compression property, and providing compressed data of the second image corresponding to the third block and the fourth block to the processor via the designated interface.

According to an embodiment, there may be provided a non-transitory computer-readable recording medium retaining a program executed on a computer, where the program may comprise executable instructions that, when executed by a processor, enable the processor to obtain a first image and a second image subsequent to the first image using an image sensor, segment the first image into a plurality of blocks including a first block and a second block and compress the first image by a control circuit, where in compressing the first image, the executable instructions further enable the processor to generate first compression loss data corresponding to the first block and second compression loss data corresponding to the second block, provide compressed data of the first image corresponding to the first block and the second block to the processor via a designated interface, identify, by the control circuit, a first compression property based on the first compression loss data and the second compression loss data, segment the second image into a plurality of blocks including a third block and a fourth block that respectively correspond to the first block and the second block and compressing the second image by the control circuit, where in compressing the second image, the executable instructions further enable the processor to compress the third block according to the first compression property, generate third compression loss data corresponding to the third block, and when a difference between the first compression loss data and the third compression loss data meets a first predetermined condition, compress the fourth block according to the first compression property, and when the difference between the first compression loss data and the third compression loss data meets a second predetermined condition, compress the fourth block according to a second compression property different from the first compression property, and provide compressed data of the second image corresponding to the third block and the fourth block to the processor via the designated interface.

Other aspects, advantages, and salient features of the disclosure will become apparent to those skilled in the art from the following detailed description, which, taken in conjunction with the annexed drawings, discloses exemplary embodiments of the disclosure.

BRIEF DESCRIPTION OF THE DRAWINGS

A more complete appreciation of the disclosure and many of the attendant aspects thereof will be readily obtained as the same becomes better understood by reference to the following detailed description when considered in connection with the accompanying drawings, wherein.

Throughout the drawings, like reference numerals will be understood to refer to like parts, components, and structures.

DETAILED DESCRIPTION

Figure 1:
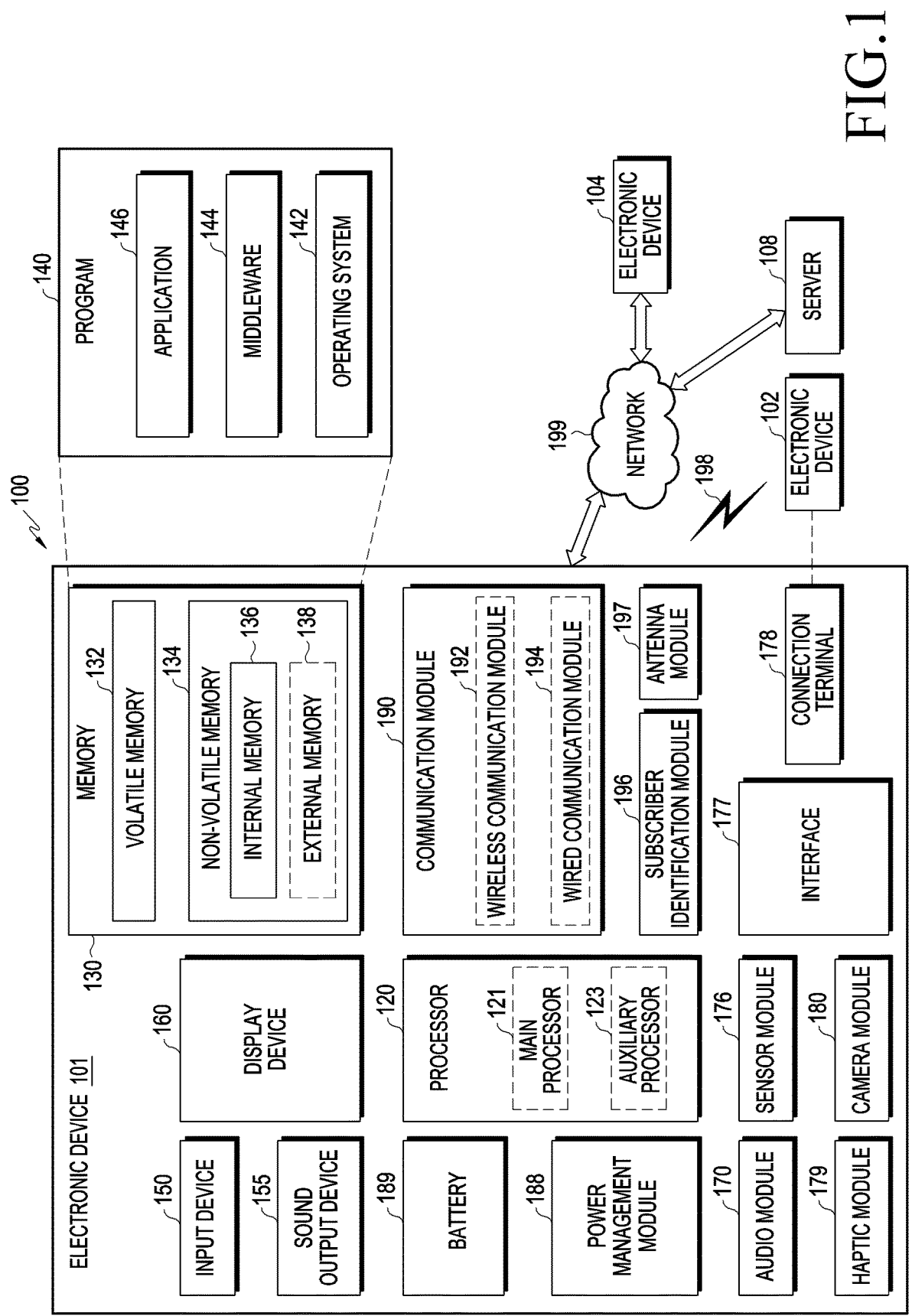
FIG. 1 is a block diagram illustrating an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, a memory 130, an input device 150, a sound output device 155, a display device 160, an audio module 170, a sensor module 176, an interface 177, a haptic module 179, a camera module 180, a power management module 188, a battery 189, a communication module 190, a subscriber identification module 196, and an antenna module 197. In some embodiments, the electronic device 101 may exclude at least one (e.g., the display device 160 or the camera module 180) of the components or add other components. In some embodiments, some components may be implemented to be integrated together, e.g., as if the sensor module 176 (e.g., a fingerprint sensor, an iris sensor, or an illuminance sensor) is embedded in the display device 160 (e.g., a display).

The processor 120 may drive, e.g., software (e.g., a program 140) to control at least one other component (e.g., a hardware or software component) of the electronic device 101 connected with the processor 120 and may process or compute various data. The processor 120 may load and process a command or data received from another component (e.g., the sensor module 176 or the communication module 190) on a volatile memory 132, and the processor 120 may store resultant data in a non-volatile memory 134. According to an embodiment, the processor 120 may include a main processor 121 (e.g., a central processing unit (CPU) or an application processor), and additionally or alternatively, an auxiliary processor 123 (e.g., a graphics processing unit (GPU), an image signal processor, a sensor hub processor, or a communication processor) that is operated independently from the main processor 121 and that consumes less power than the main processor 121 or is specified for a designated function. Here, the auxiliary processor 123 may be operated separately from or embedded in the main processor 121.

In such case, the auxiliary processor 123 may control at least some of functions or states related to at least one (e.g., the display device 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., performing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or sensor module 176) of the electronic device 101, e.g., software (e.g., the program 140) and input data or output data for an instruction related to the software. The memory 130 may include the volatile memory 132 or the non-volatile memory 134.

The program 140, as software stored in the memory 130, may include, e.g., an operating system (OS) 142, middleware 144, or an application 146.

The input device 150 may be a device for receiving an instruction or data, which is to be used for a component (e.g., the processor 120) of the electronic device 101, from an outside (e.g., a user) of the electronic device 101. The input device 150 may include, e.g., a microphone, a mouse, or a keyboard.

The sound output device 155 may be a device for outputting sound signals to the outside of the electronic device 101. The sound output device 155 may include, e.g., a speaker which is used for general purposes, such as playing multimedia or recording and playing, and a receiver used for call receiving purposes only. According to an embodiment, the receiver may be formed integrally or separately from the speaker.

The display 160 may be a device for visually providing information to a user of the electronic device 101. The display device 160 may include, e.g., a display, a hologram device, or a projector and a control circuit for controlling the display, hologram device, or projector. According to an embodiment, the display device 160 may include touch circuitry or a pressure sensor capable of measuring the strength of a pressure for a touch.

The audio module 170 may convert a sound into an electrical signal and vice versa. According to an embodiment, the audio module 170 may obtain a sound through the input device 150 or output a sound through the sound output device 155 or an external electronic device (e.g., an electronic device 102 (e.g., a speaker or a headphone) wiredly or wirelessly connected with the electronic device 101.

The sensor module 176 may generate an electrical signal or data value corresponding to an internal operating state (e.g., power or temperature) or external environmental state of the electronic device 101. The sensor module 176 may include, e.g., a gesture sensor, a gyro sensor, an atmospheric pressure sensor, a magnetic sensor, an acceleration sensor, a grip sensor, a proximity sensor, a color sensor, an infrared (IR) sensor, a bio sensor, a temperature sensor, a humidity sensor, or an illuminance sensor.

The interface 177 may support a designated protocol enabling a wired or wireless connection with an external electronic device (e.g., the electronic device 102). According to an embodiment, the interface 177 may include a high definition multimedia interface (HDMI), a universal serial bus (USB) interface, a secure digital (SD) card interface, or an audio interface.

A connecting terminal 178 may include a connector, e.g., a HDMI connector, a USB connector, an SD card connector, or an audio connector (e.g., a headphone connector), which is able to physically connect the electronic device 101 with an external electronic device (e.g., the electronic device 102).

The haptic module 179 may convert an electrical signal into a mechanical stimulus (e.g., a vibration or motion) or electrical stimulus which may be recognized by a user via his tactile sensation or kinesthetic sensation. The haptic module 179 may include, e.g., a motor, a piezoelectric element, or an electric stimulator.

The camera module 180 may capture a still image or moving images. According to an embodiment, the camera module 180 may include one or more lenses, an image sensor, an image signal processor, or a flash.

The power management module 188 may be a module for managing power supplied to the electronic device 101. The power management module 188 may be configured as at least part of, e.g., a power management integrated circuit (PMIC).

The battery 189 may be a device for supplying power to at least one component of the electronic device 101. The battery 189 may include, e.g., a primary cell which is not rechargeable, a secondary cell which is rechargeable, or a fuel cell.

The communication module 190 may support establishing a wired or wireless communication channel between the electronic device 101 and an external electronic device (e.g., the electronic device 102, the electronic device 104, or the server 108) and performing communication through the established communication channel. The communication module 190 may include one or more communication processors that are operated independently from the processor 120 (e.g., an application processor) and supports wired or wireless communication.

According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of the wireless communication module 192 and the wired communication module 194 may be used to communicate with an external electronic device through a first network 198 (e.g., a short-range communication network, such as Bluetooth, Bluetooth low energy (BLE), wireless-fidelity (Wi-Fi) direct, or infrared data association (IrDA)) or a second network 199 (e.g., a long-range communication network, such as a cellular network, the Internet, or a communication network (e.g., LAN or wide area network (WAN)). The above-enumerated types of communication modules 190 may be implemented in a single chip or individually in separate chips.

According to an embodiment, the wireless communication module 192 may differentiate and authenticate the electronic device 101 in the communication network using user information stored in the subscriber identification module 196.

The antenna module 197 may include one or more antennas for transmitting or receiving a signal or power to/from an outside. According to an embodiment, the communication module 190 (e.g., the wireless communication module 192) may transmit or receive a signal to/from an external electronic device through an antenna appropriate for a communication scheme.

Some of the above-described components may be connected together through an inter-peripheral communication scheme (e.g., a bus, general purpose input/output (GPIO), serial peripheral interface (SPI), or mobile industry processor interface (MIPI)), communicating signals (e.g., instructions or data) therebetween.

According to an embodiment, instructions or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations executed on the electronic device 101 may be run on one or more other external electronic devices. According to an embodiment, when the electronic device 101 should perform a certain function or service automatically or at a request, the electronic device 101, instead of, or in addition to, executing the function or service on its own, may request an external electronic device to perform at least some functions associated therewith. The external electronic device (e.g., electronic devices 102 and 104 or server 106) may execute the requested functions or additional functions and transfer a result of the execution to the electronic device 101. The electronic device 101 may provide a requested function or service by processing the received result as it is or additionally. To that end, a cloud computing, distributed computing, or client-server computing technology may be used, for example.

Figure 2:
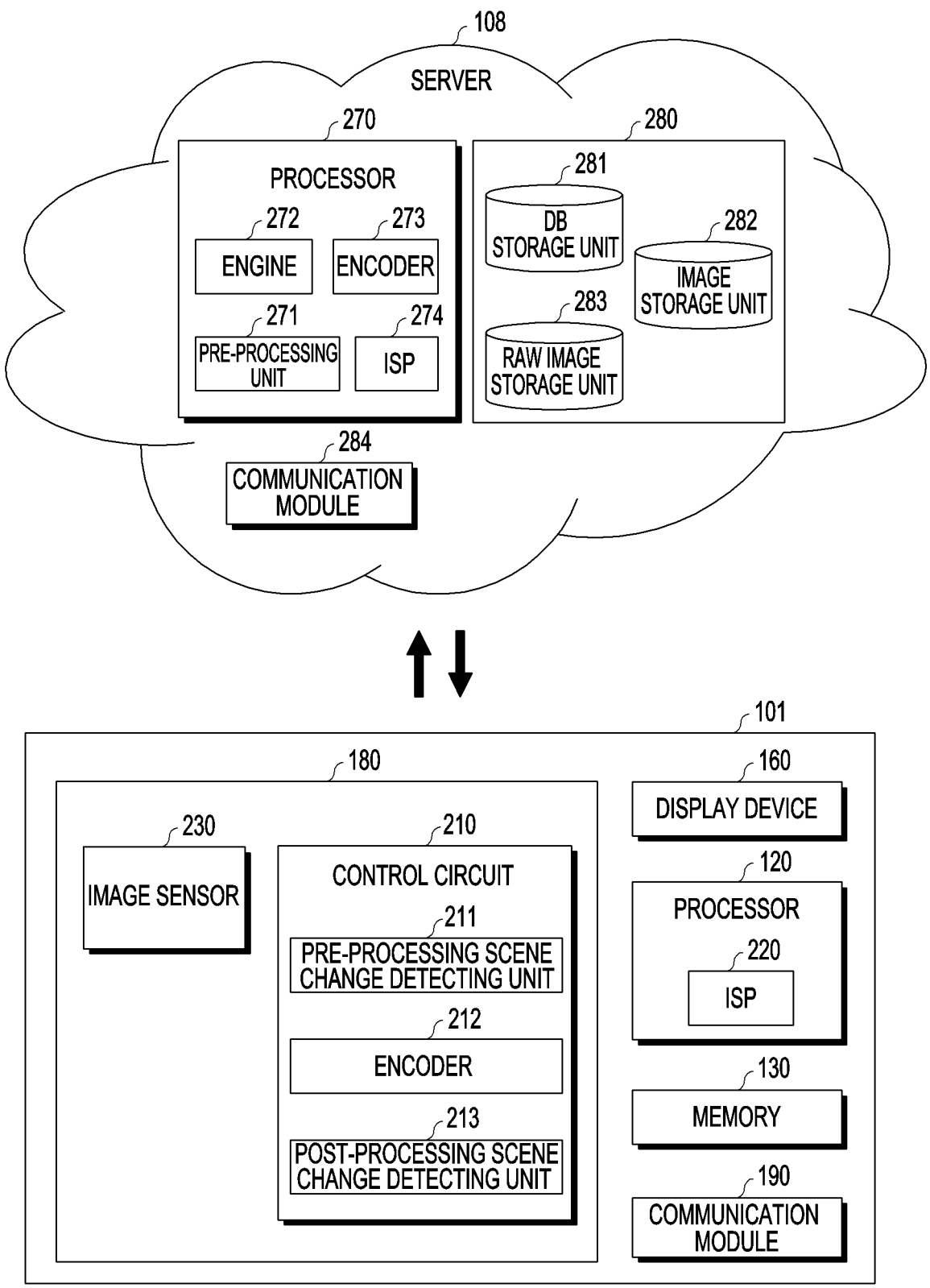
FIG. 2 is a block diagram illustrating an electronic device and a server according to an embodiment.

FIG. 2 is a block diagram illustrating an electronic device 101 and a server 108 according to an embodiment of the disclosure. Referring to FIG. 2, according to an embodiment, an electronic device 101 may include a processor 120, a memory 130, a display device 160, a camera module 180, and a communication module 190. A server 108 may include a processor 270, a memory 280, and a communication module 284. The camera module 180 may include a control circuit 210 and an image sensor 230. The control circuit 210 may include a pre-processing scene change detecting unit 211, an encode 212, and a post-processing scene change detecting unit 213. The processor 120 of the electronic device 101 may include an image signal processor (ISP) 220. The processor 270 of the server 108 may include a pre-processing unit 271, an engine 272, an encoder 273, and an ISP 274. The memory 280 of the server 108 may include a database storage unit 281, an image storage unit 282, and a raw image storage unit 283.

The processor 120 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In addition, it would be recognized that when a general purpose computer accesses code for implementing the processing shown herein, the execution of the code transforms the general purpose computer into a special purpose computer for executing the processing shown herein. Certain of the functions and steps provided in the Figures may be implemented in hardware, software or a combination of both and may be performed in whole or in part within the programmed instructions of a computer. No claim element herein is to be construed under the provisions of 35 U.S.C. § 112(f), unless the element is expressly recited using the phrase "means for." In addition, an artisan understands and appreciates that a "processor" or "microprocessor" may be hardware in the claimed disclosure. Under the broadest reasonable interpretation, the appended claims are statutory subject matter in compliance with 35 U.S.C. § 101.

According to an embodiment, the image sensor 230 may obtain raw images in various formats. For example, when a raw image is in Bayer format, the raw image may be represented as red, green, and blue pixels and values of the pixels may be expressed in a bit depth ranging from 8 bits to 16 bits. A color filter array (CFA) pattern may be applied to the raw image. The raw image may have a layered structure containing various pieces of color information (e.g., red, green, and blue) for each pixel. The image sensor 230 may obtain the raw image containing phase difference information as well as color information, such as the aforementioned RGB information. The metadata of image capturing-related information (e.g., the time of capture, location of capture, or illuminance) may be stored in association with the raw image. The control circuit 210 may perform some signal processing on the raw image obtained by the image sensor 230. According to an embodiment, the control circuit 210 may compress the raw image and provide the compressed raw image to the processor 120. According to an embodiment, the image sensor 230 may obtain additional information regarding the image capture, such as sensitivity (ISO), time of exposure, shutter speed, and motion, upon capturing the image. This additional data obtained by the image sensor 230 may be provided to the control circuit 210 or the processor 120.

According to an embodiment, the control circuit 210 may perform various processes related to image processing of the raw image received from the image sensor 230. The control circuit 210 may be implemented as a single independent processor or as part of another processor (e.g., the processor 120). At least one of the pre-processing scene change detecting unit 211, the encoder 212, or the post-processing scene change detecting unit 213 of the control circuit 210 may be included in another processor (e.g., the processor 120). The control circuit 210 may be integrated with the camera module 180 or be a component separate from the camera module 180. In other words, the various processes described herein may be performed by the processor 120 alone or be distributively processed by a plurality of processors.

According to an embodiment, the pre-processing scene change detecting unit 211 may identify whether there is a scene change between a first image and a second image that were continuously obtained by the image sensor 230. For example, a scene change may arise when a change is made to the object (e.g., a figure, thing, background, or scene) captured by the image sensor 230. According to an embodiment, the pre-processing scene change detecting unit 211 may identify whether there is a scene change between the first image and the second image by using any one of the sensitivity (ISO), time of exposure, shutter time, and motion information sensed by the image sensor 230 and information related to image capturing (e.g., the time of capture and place of capture). For example, the pre-processing scene change detecting unit 211 may identify that a scene change has been made between the first image and the second image when the difference in sensitivity (ISO) of the image sensor between when the image sensor 230 captures the first image and the image sensor 230 captures the second image is larger than a predetermined threshold. In this case, the similarity between the first image and the second image may be identified to be low. As another example, the pre-processing scene change detecting unit 211 may identify that no scene change has been made between the first image and the second image when the difference in time of exposure between when the image sensor 230 captures the first image and the image sensor 230 captures the second image is smaller than a predetermined threshold. In this case, the similarity between the first image and the second image may be identified to be high. When the first image and the second image are similar to each other, the per-area complexity distribution of the first image may be similar to the per-area complexity distribution of the second image. According to an embodiment, the electronic device may identify whether the first image and the second image are similar in per-area complexity distribution to each other based on whether there is a scene change between the first image and the second image. If the images are similar, the electronic device may efficiently compress the second image using the per-area complexity distribution information of the first image. As such, whether there is a scene change identified by the pre-processing scene change detecting unit 211 may be used for the encoder 212 to compress images.

According to an embodiment, the encoder 212 may obtain the image obtained by the image sensor 230. The encoder 212 may sequentially compress the first image and second image continuously obtained by the image sensor 230. According to an embodiment, the encoder 212, in order to compress the first image and the second image continuously obtained by the image sensor 230, may compress the second image by selectively using the compression property information corresponding to the first image based on whether there is a scene change. For example, when there is no scene change between the current image to be compressed and the prior image obtained before obtaining the current image, the encoder 212 may efficiently compress the current image by using the compression property information corresponding to the prior image. As another example, when there is a scene change between the current image to be compressed and the prior image obtained before obtaining the current image, the encoder 212 may compress the current image according to a predetermined compression property without referring to the compression property information corresponding to the prior image. When there is no scene change between the prior image and the current image, the prior image and the current image may be identified to be similar to each other. Upon compressing the current image by using the compression property information identified based on compression loss data generated while the prior image is compressed, the compressed image may be of a better quality while having the same compression ratio.

According to an embodiment, while compressing the first image and the second image that were continuously obtained by the image sensor 230, the encoder 212 may generate compression loss data for the first image and second image and identify the compression property information of each of the first image and the second image based on the compression loss data. For example, the encoder 212 may segment the first image into a plurality of blocks, and while compressing the plurality of blocks, generate per-block compression loss data amount, brightness information, and edge information on the plurality of blocks. According to an embodiment, the compression loss data amount may be the number of bit planes deleted or the number of bits lost while compressing the corresponding block. The brightness information may be the mean per-pixel brightness value. The edge information may be the number of edges included in the corresponding block. The encoder 212 may identify the compression property in proportion to the compression loss data amount for each block in the first image. For example, the encoder 212 may make such an identification so as to allocate more resources, such as increasing the file size so that the first image is less compressed, as the amount of compression loss data increases. After compressing the first image, the encoder 212 may segment the second image into a plurality of blocks and compress the plurality of blocks. According to an embodiment, the encoder 212 may identify the compression property using any one of the per-block loss data amount, brightness information, and edge information generated while compressing the first image and compress the second image according to the identified compression property. According to an embodiment, when there is no scene change between the first image and the second image, the encoder 212 may compress the second image using the compression property information identified based on the first image. In this case, the compression efficiency of the second image may be enhanced. When there is a scene change between the first image and the second image, the encoder 212 may compress the second image according to a predetermined compression property without using the compression property information identified based on the first image. Thus, the encoder 212 may use scene change information to selectively apply compression property information of the previous image to the image currently being compressed.

According to an embodiment, compression may be further refined by a post-processing scene change detecting unit 213. For example, the post-processing scene change detecting unit 213 may sequentially compress the first image and second image continuously obtained by the image sensor 230 and identify whether there is a scene change between the first image and the second image after the second image is compressed. The post-processing scene change detecting unit 213 may compare the compression loss data of the first image with the compression loss data generated while compressing the second image and identify whether there is a scene change between the compressed first image and second image and the degree of scene change based on the difference. For example, the post-processing scene change detecting unit 213 may segment the first image into a plurality of blocks including a first block and a second block and compress them, generate a first complexity corresponding to the first block while compressing the first block, and generate a second complexity corresponding to the second block while compressing the second block. The first complexity and the second complexity may be identified according to the compression loss data, the brightness of the block, and the number of edges included in the block. The post-processing scene change detecting unit 213 may segment the second image into a plurality of blocks including a third block and a fourth block corresponding to the first block and second block of the first image and compress them and generate a third complexity for the third block while compressing the third block. The post-processing scene change detecting unit 213 may compare the third complexity for the third block with the first complexity for the first block corresponding to the third block, and when the difference is larger than a threshold, identify that there is a scene change between the first image and the second image. Or, the post-processing scene change detecting unit 213 may compare the third complexity for the third block with the first complexity for the first block corresponding to the third block, and when the difference is equal to or smaller than the threshold, identify that there is no scene change between the first image and the second image. The post-processing scene change detecting unit 213 may provide information about whether there is a scene change between the first image and the second image to the encoder 212. The encoder 212 may compress the fourth block of the second image. When the post-processing scene change detecting unit 213 determines that there is no scene change, the encoder 212 may compress the fourth block of the second image by using the second complexity for the second block of the first image. Alternatively, when the post-processing scene change detecting unit 213 determines that there is a scene change, the encoder 212 may compress the fourth block of the second image according to a predetermined compression property without using the second complexity for the second block of the first image.

According to an embodiment, the encoder 212 may provide the compressed image to the processor 120. The processor 120 may transmit at least one of the raw image or compressed image to the server 108 through, e.g., the communication module 190. The server 108 may receive at least one of the raw image or compressed image through the communication module 284. The communication module 284 may communicate with, e.g., the communication module 190. The server 108 may perform network management for the electronic device 101, service management related to services and authorities provided to the electronic device 101, and storage management. The raw image may be transitorily or non-transitorily stored in the raw image storage unit 283 in the server 108.

According to an embodiment, the pre-processing unit 271 may perform the processing required before providing the received images to the engine 272 or ISP 274. For example, when the compressed raw image is received through the communication module 290, the pre-processing unit 271 may decompress the compressed raw image, thus obtaining the raw image. The pre-processing unit 271 may receive the images to be pre-processed through the communication module 290. The pre-processing unit 271 may further perform tasks such as applying a quality enhancing algorithm, de-mosaic processing, or image reformatting on the received or decompressed images.

According to an embodiment, the engine 272 may analyze the raw image from the pre-processing unit 271 and perform various tasks such as object recognition, speed vector determination, face recognition, segmentation, scene parsing, or texture recognition. The engine 272 may use various algorithms to perform the above-mentioned tasks. According to an embodiment, the server 108 may have relatively high computation capacity, storage, and better resources such that algorithms that required heavy computation are more efficiently performed by the server 108. As a result of performing the various tasks, the engine 272 may generate, store, or provide information usable for various image processes executed by the ISP 274. This information may include information containing the results of object recognition, speed vectors in the image, results of face recognition, results of segmentation, scene category, or texture information.

According to an embodiment, the ISP 274 may perform various image processes on the raw image by using various pieces of information from the engine 272. According to an embodiment, the electronic device 101 may receive the various pieces of information and perform image processing using the various pieces of information. In this case, the electronic device 101 may comprehensively perform image processing provided from the ISP 220 and image processing by using the various pieces of information. The electronic device 101 may transitorily or non-transitorily store the image-processed image in the memory 130 or display on the display device 160. Meanwhile, as described above, when the ISP 274 performs image processing, the image processing may be performed based on the recipe information. The ISP 274 may receive information (e.g., results of object recognition) from the database storage unit 281 and use the same for image processing purposes. The database storage unit 281 may store various pieces of information obtained by the engine 272. The processed image may be transmitted back to the electronic device 101 or stored in the image storage unit 282 in the server 108. The ISP 274 may perform various processes, such as white balancing, color adjustment (e.g., color matrix, color correction, or color enhancement), color filter array interpolation, noise canceling or sharpening, image enhancing (e.g., high-dynamic-range (HDR) or face detection) using the previously-described information. The ISP 274 may also perform image processing requiring heavy computation, such as original color mapping, detail re-generation, text recognition, or image inpainting.

According to an embodiment, the server 108 may be a cloud server. The server 108 may perform, e.g., network management, cloud service management related to, e.g., services and authorities provided to the electronic device 101, and storage management on an electronic device (e.g., the electronic device 101) connected to the server 108.

Figure 3:
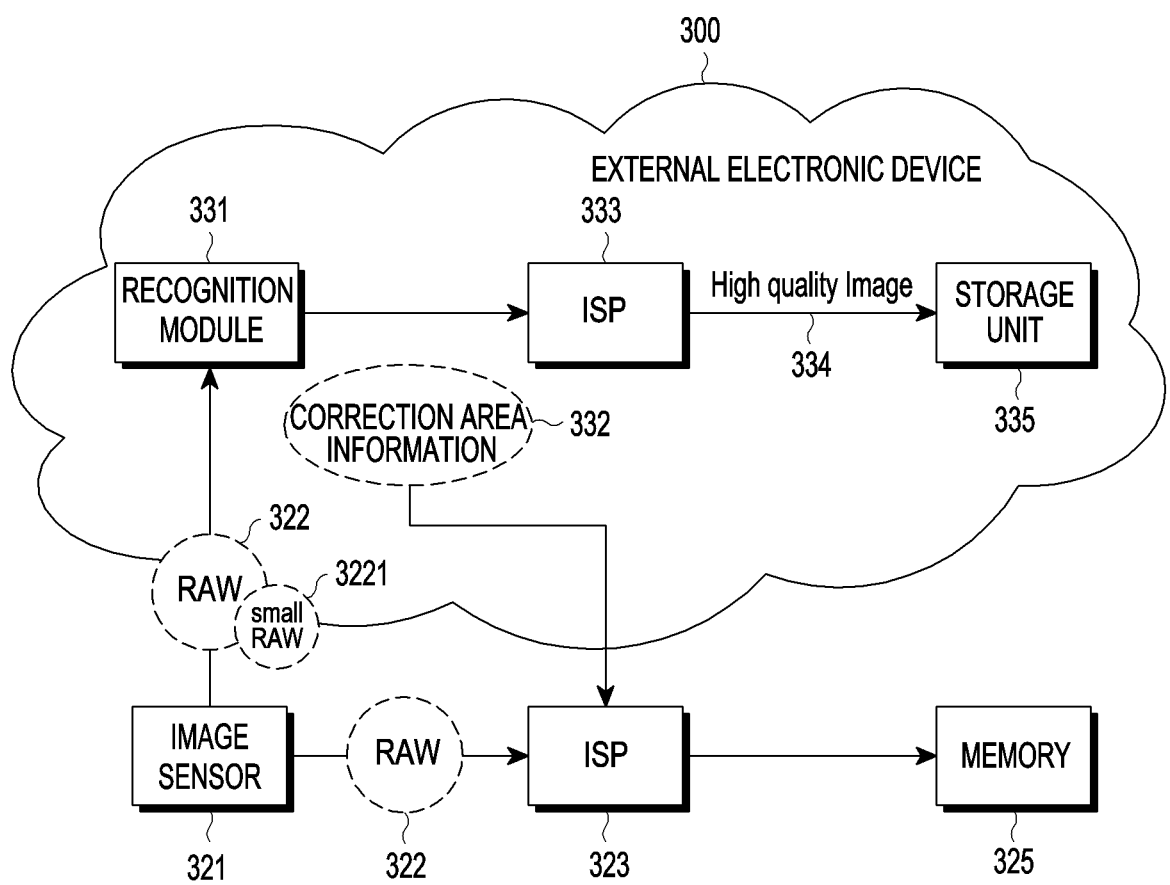
FIG. 3 is a block diagram illustrating operations of an electronic device and an external electronic device according to an embodiment.

FIG. 3 is a block diagram illustrating operations of an electronic device and an external electronic device according to an embodiment. According to an embodiment, the electronic device 101 may include an image sensor 321, an ISP 323, and a memory 325. An external electronic device 300 (e.g., the electronic device 104 or the server 108) may include a recognition module 331, an ISP 333 (e.g., the ISP 274), and a storage unit 335 (e.g., the memory 280). The recognition module 331 may be a logic module and may be implemented as a processor of the external electronic device 300. The ISP 333 may also be implemented as a processor of the external electronic device 300. For example, the processor of the external electronic device 300 may perform both recognition and image processing. Although not shown, the electronic device 101 may include a communication module (e.g., the communication interface (e.g., audio module 170) or communication module 190) capable of transmitting and receiving data with the external electronic device 300. The external electronic device 300 may include a communication module capable of communicating data with the electronic device 101.

The image sensor 321 (e.g., the camera module 180) may obtain an image of an external object (e.g. a person) and generate a raw image 322. The image sensor 321 may deliver the raw image 322 to the ISP 323. According to an embodiment, the image sensor 321 may generate a small raw image 3221 (e.g. a compressed raw image) and send the small raw image 3221 to the external electronic device 300 through the communication module. The small raw image 3221 may be sent in addition to the raw image 322. Alternatively, the processor of the electronic device 101, but not the image sensor 321, may generate the small raw image 3221 and send the generated small raw image 3221 through the communication module to the external electronic device 300.

The recognition module 331 of the external electronic device 300 may obtain the small raw image 3221 through the communication module and may perform segmentation on at least one image area from the small raw image 3221. The recognition module 331 may recognize each of at least one image area divided by the segmentation. Correction area information 332 may be generated which includes information such as information associated with a plurality of image areas, e.g., information about the coordinates of the image areas, generated from the recognition module 331, or a result of recognition. The correction area information 332 may be sent to the electronic device 101. The ISP 323 may correct the raw image 322 by using the correction area information 332, thereby generating a corrected image. The corrected image may have, e.g., YUB format. The corrected image may be stored in the memory 325. Or, the corrected image may be compressed, for example, into a JPEG image, and the compressed image may be stored in the memory 325.

According to an embodiment, the raw image 322 provided from the image sensor 321 may be sent to the external electronic device 300 separately from the small raw image 3221. Since the raw image 322 is larger in file size than the small raw image 3221, the small raw image 3221 may be first sent to the external electronic device 300, and the raw image 322 may then be sent to the external electronic device 300. For example, while the ISP 323 corrects the raw image 322, the raw image 322 may be sent to the external electronic device 300. The raw image 322 may be uploaded onto the external electronic device 300, as generated by the image sensor 321, or as a pre-processed image in which lens distortion has been compensated or noise has been canceled. Alternatively, the above-mentioned pre-processing may be performed by the external electronic device 300. In addition, the external electronic device 300 may perform additional pre-processing such as de-mosaic processing, image format conversion, or processing for raising image recognition rate. The ISP 333 of the external electronic device 300 may correct the received raw image 322. The external electronic device 300 may correct the raw image 322 by using the existing correction area information 332 generated or by using expanded correction area information. The raw image 322 may have a higher resolution than that of the small raw image 3221. Thus, the ISP 333 of the external electronic device 300 may obtain expanded correction area information from the high-resolution image, where the expanded correction area information will have more detail than the correction area information 332. The ISP 333 may also generate the expanded correction area information by using the raw image 322 along with the existing correction area information generated. The ISP 333 may obtain the high-resolution image or high-quality image 334 by correcting the raw image 322 using the expanded correction area information. The high-resolution image 334 may be stored in the storage unit 335 of the external electronic device 300 and may be downloaded to the electronic device 101.

Figure 4:
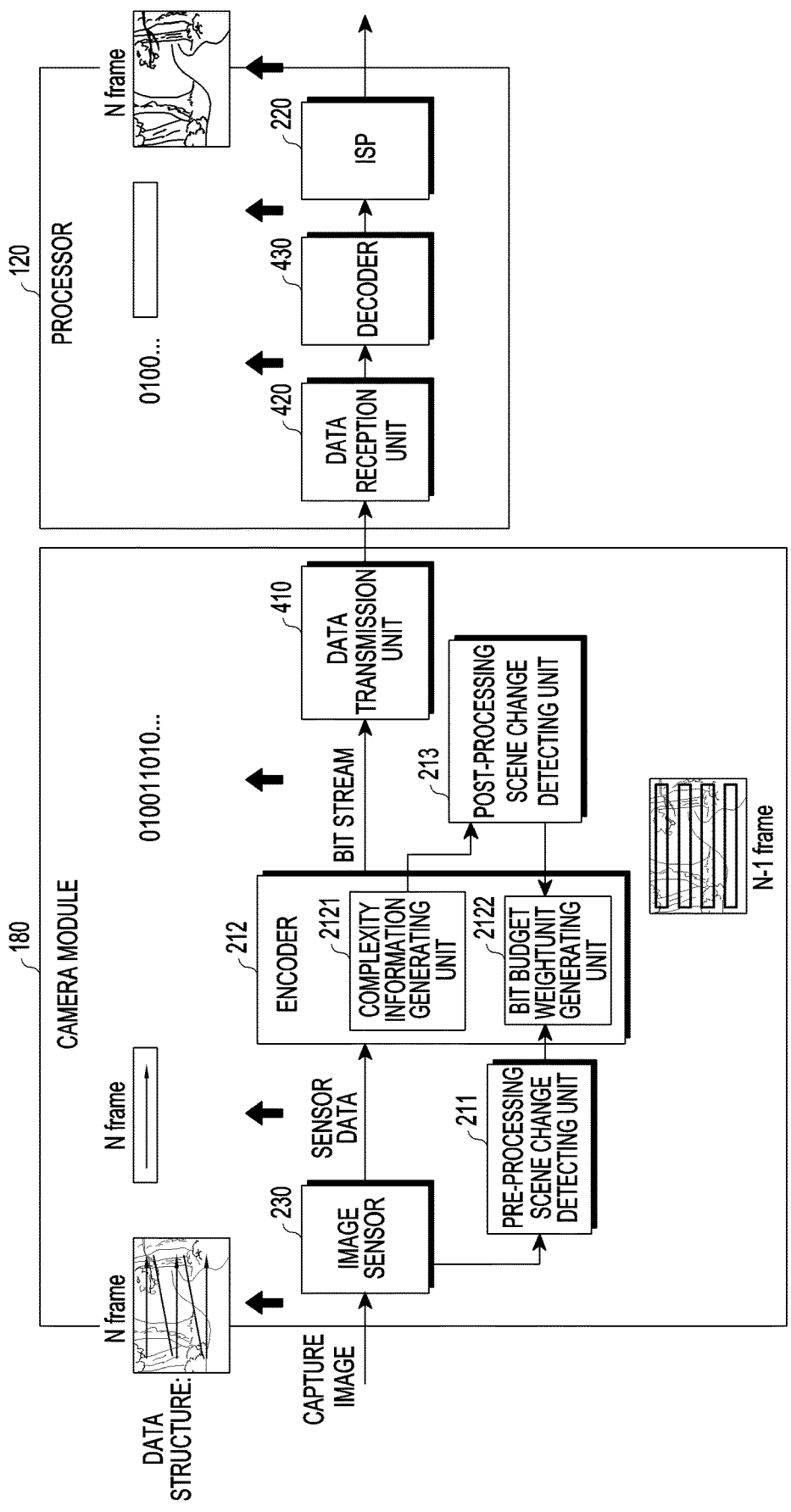
FIG. 4 is a block diagram illustrating a method for compressing an image and providing the compressed image from an image sensor to a processor of an electronic device, according to an embodiment.

FIG. 4 is a block diagram illustrating a method for compressing an image and providing the compressed image from an image sensor to a processor of an electronic device, according to an embodiment. According to an embodiment, an electronic device (e.g., the electronic device 101 of FIG. 1) may include a camera module 180 and a processor 120. The camera module 180 may include an image sensor 230, a pre-processing scene change detecting unit (PRE) 211, an encoder 212, a post-processing scene change detecting unit (POST) 213, and a data transmission unit 410. The processor 120 may include a data reception unit 420, a decoder 430, and an ISP 220.

Figure 6:
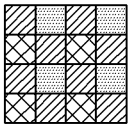
FIG. 6 is a view illustrating various exemplary raw images obtained by an electronic device according to an embodiment.
Figure 6:
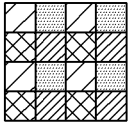
Figure 6:
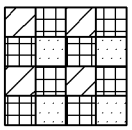
Figure 6:
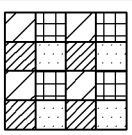
Figure 6:
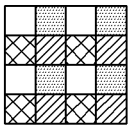
Figure 6:
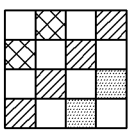
Figure 6:
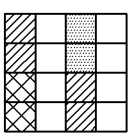
Figure 6:
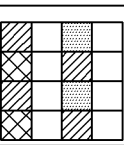

The image sensor 230 may capture a raw image. The image sensor 230 may provide the obtained image to the encoder 212. According to an embodiment, the image sensor 230 may segment the image into a plurality of blocks and sequentially provide the blocks to the encoder 212. The image obtained by the image sensor 230 may be in Bayer format. For example, the image data generated by the image sensor 230 may have various patterns including the Bayer pattern as shown in FIG. 6. According to an embodiment, the image sensor 230 may provide the Bayer image to the encoder 212 on a per line basis. According to an embodiment, the image data may be obtained as a frame or a series of frames. According to an embodiment, the image sensor 230 may further sense sensitivity (ISO), exposure time, shutter speed, and motion. The image sensor 230 may provide the sensed information to the pre-processing scene change detecting unit 211 or encoder 212.

The pre-processing scene change detecting unit 211 may be situated between the image sensor 230 and the encoder 212. The pre-processing scene change detecting unit 211 may receive the sensed information from the image sensor 230 and identify a scene change between the current frame (nth frame) and the prior frame (n−1th frame) using the sensed information. In other words, the pre-processing scene change detecting unit 211 may identify whether there is a scene change between the current frame and the prior frame by using at least one of the sensitivity (ISO), exposure time, shutter speed, or motion information sensed by the image sensor 230. For example, the pre-processing scene change detecting unit 211 may identify the difference between the current frame and the prior frame by using the motion information and identify whether there is a scene change and/or the degree of scene change based on the identified difference. The pre-processing scene change detecting unit 211 may provide the information regarding whether there is a scene change to the encoder 212. The encoder 212 may compress the current frame based on the information from the pre-processing scene change detecting unit 211. For example, the pre-processing scene change detecting unit 211 may generate information regarding the degree of scene change and provide the information to a bit budget weight generating unit 2122 included in the encoder 212. The bit budget weight generating unit 2122 may identify how much bit budget should be allocated to compress the current frame based on the information regarding the degree of scene change. For example, the bit budget weight generating unit 2122 may identify how many bits to allocate for compressing of blocks in the current frame when the current frame is segmented into a plurality of blocks.

The encoder 212 may include a complexity information generating unit 2121 and a bit budget weight generating unit 2122. The encoder 212 may compress the image received from the image sensor 230. The encoder 212 may allocate bits to each block in the image according to the bit budget weight generated by the bit budget weight generating unit 2122 to compress the image. According to an embodiment, the encoder 212 may allocate bits to each block in the current frame according to the complexity and bit budget weight of each block in the prior frame. The encoder 212 may generate compression loss data, brightness, and edge count for each area in the image while compressing the image. According to an embodiment, the encoder 212 may segment the image into a plurality of blocks and compress the blocks and may generate compression loss data, brightness, and edge count for the plurality of blocks. For example, the encoder 212 may compress the plurality of blocks and may generate compression loss data for the compressed blocks. The complexity information generating unit 2121 may generate per-block complexity information based on the compression loss data, brightness, and edge count generated while the encoder 212 compresses the blocks. For example, the complexity information generating unit 2121 may identify that the complexity of the first block increases as the compression loss data amount of the first block increases. As another example, the complexity information generating unit 2121 may identify that the complexity increases as the brightness of the first block decreases. The complexity information generating unit 2121 may identify that the complexity increases as the number of edges included in the first block increases. As the complexity of a particular block increases, more bits may be required to compress the block. The encoder 212 may compress a block and then calculate the complexity of the block. Thus, as the complexity of the block may be identified more accurately to compress the block, the efficiency of compression may go up. The bit budget weight generating unit 2122 may identify the compression property (bit budget) based on the complexity information of the plurality of blocks. According to an embodiment, the bit budget weight generating unit 2122 may identify the compression property to allocate the bit budget based on the complexity of each block of the plurality of blocks of the first image.

The post-processing scene change detecting unit 213 may identify whether there is a scene change between the first image and the second image, and if any, the degree of scene change by using the compression loss data of the completed blocks. This may be done while the encoder 212 is in the process of sequentially compressing the first image and the second image continuously obtained by the image sensor 230. According to an embodiment, the encoder 212 may segment the first image into a plurality of blocks including the first block and the second block and sequentially compress the plurality of blocks while generating first compression loss data corresponding to the first block and second compression loss data corresponding to the second block. The bit budget weight generating unit 2122 may identify a first compression property based on the first compression loss data and the second compression loss data. The encoder 212 may segment the second image into a plurality of blocks including a third block and a fourth block corresponding to the respective positions of the first block and the second block in the first image and compress them. The encoder 212 may compress the third block according to the first compression property and generate the third compression loss data corresponding to the third block. The post-processing scene change detecting unit 213 may make a comparison as to the difference between the third compression loss data and the first compression loss data, and when the difference is larger than a predetermined threshold, identify that there is a scene change between the first image and the second image. The post-processing scene change detecting unit 213 may identify that there is no scene change when the difference is equal to or smaller than the threshold. The post-processing scene change detecting unit 213 may provide the identified information as to whether there is a scene change to the bit budget weight generating unit 2122. The bit budget weight generating unit 2122 may apply the first compression property in compressing the fourth block when there is no scene change. When there is a scene change, the bit budget weight generating unit 2122 may identify a second compression property different from the first compression property to compress the fourth block.

The compression data generated by the encoder 212 may be provided to the processor 120 through a designated interface.

According to an embodiment, the data transmission unit 410 of the camera module 10 may provide the bit stream generated as the encoder 212 compresses the image data through the designated interface to the data reception unit 420 of the processor 120. For example, the designated interface may follow the MIPI D-PHY/C-PHY transmission standard.

The data reception unit 420 may provide the received bit stream to the decoder 430 to decompress the bit stream into the image data.

The decoder 430 may decompress the bit stream into the image data and provide the image data to the ISP 220.

The ISP 220 may perform various processes on the received image data.

Figure 5:
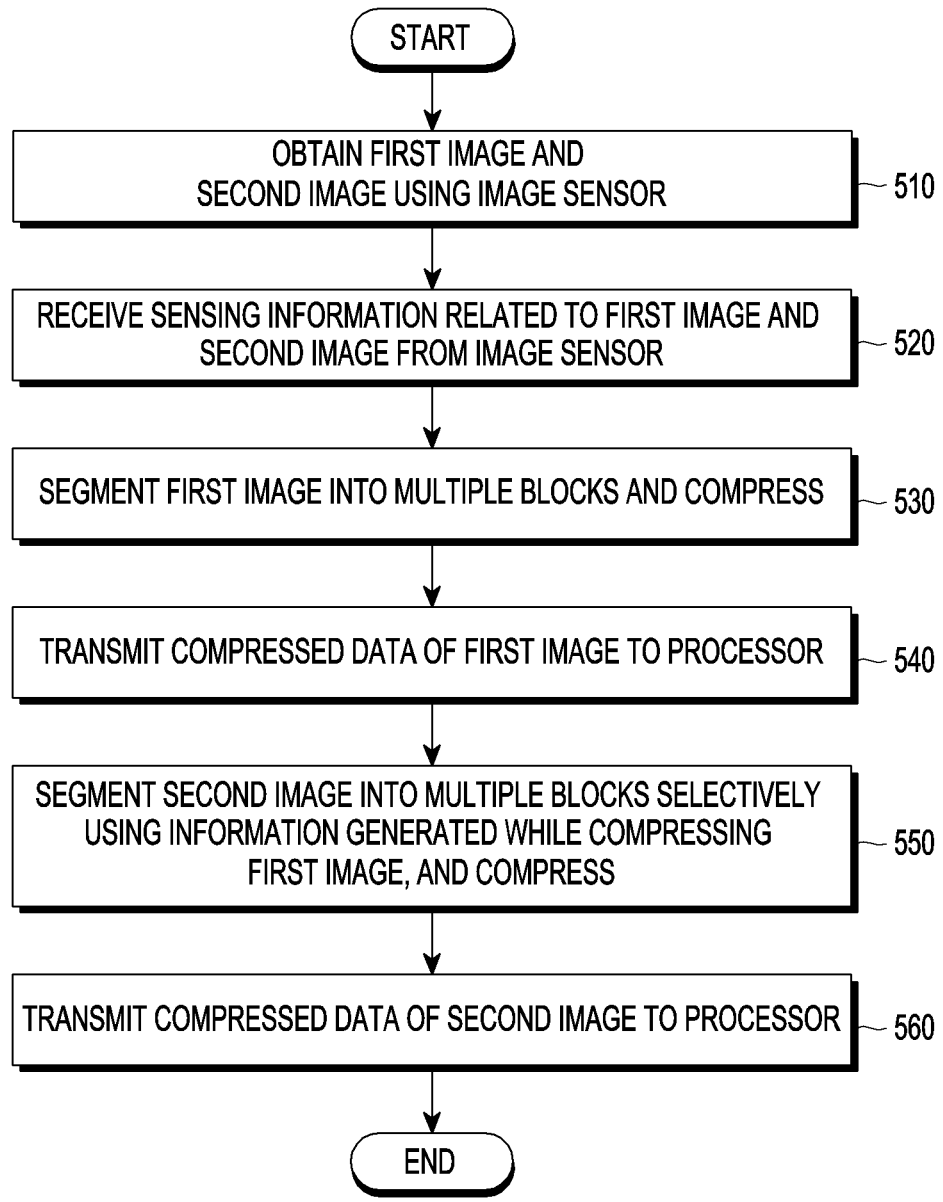
FIG. 5 is a flowchart illustrating a method for operating an electronic device to compress an image according to an embodiment.

FIG. 5 is a flowchart illustrating a method for operating an electronic device to compress an image according to an embodiment.

Referring to FIG. 5, according to an embodiment, an electronic device (e.g., the electronic device 101 or the control circuit 210 of FIG. 2), in operation 510, may continuously obtain a first image and a second image by using an image sensor (e.g., the image sensor 230 of FIG. 2).

In operation 520, the control circuit 210 may receive first sensing information related to the first image and second sensing information related to the second image from the image sensor 230. For example, the control circuit 210 may receive sensitivity information or exposure time information which is obtained by the image sensor 230 upon capturing the first image and the second image.

In operation 530, the control circuit 210 may segment the first image into a plurality of blocks including a first block and a second block and compress them. Compressing the first image by the control circuit 210 may include generating first compression loss data corresponding to the first block and second compression loss data corresponding to the second block.

In operation 540, the control circuit 210 may provide the compression data of the first image corresponding to the first and second blocks to a processor (e.g., the processor 120 of FIG. 2) through a designated interface.

In operation 550, the control circuit 210 may segment the second image into a plurality of blocks including a third block and a fourth block corresponding to the respective positions of the first block and the second block and selectively using the information (e.g., the first compression loss data and second compression loss data) generated while compressing the first image to compress them. According to an embodiment, the electronic device 101 may compress the third block or fourth block according to the first compression property identified based on the information generated while compressing the first image. According to another embodiment, the electronic device 101 may compress the third block or fourth block according to a second compression property different from the first compression property. According to yet another embodiment, the electronic device 101 may compress the third block according to the first compression property and compress the fourth block according to the second compression property. For example, the electronic device 101 may compare the first sensing information and the second sensing information, and upon determining a scene change between the first image and the second image, compress the third block and the fourth block according to the second compression property. As another example, the electronic device 101 may compress the third block according to the first compression property, and while compressing the third block, generate third compression loss data corresponding to the third block. The electronic device 101 may compare the first compression loss data and the third compression loss data, and when the difference meets a predetermined condition, identify that there is a scene change between the first image and the second image, and compress the fourth block according to the second compression property.

In operation 560, the control circuit 210 may provide the compression data of the second image corresponding to the third and fourth blocks to the processor 120 through a designated interface.

FIG. 6 is a view illustrating various exemplary raw images obtained by an electronic device according to an embodiment. According to an embodiment, the electronic device 101 may obtain a raw image through the image sensor 230. The raw image may have various formats. Referring to FIG. 6, the raw image may be obtained using a Bayer filter (a), an RGBE filter (b), a CYYM filter (c), a CYGM filter (d), an RGBW Bayer (e), an RGBW #1(f), an RGBW #2(g), or an RGBW #3(h).

The Bayer filter (a) may be an RGB filter having one blue, one red, and two green sub-pixels.

The RGBE filter (b) may be a filter resulting from replacing one of the two green sub-pixels in the Bayer filter (a) with an emerald color.

The CYYM filter (c) may include one cyan, two yellow, and one magenta sub-pixels.

The CYGM filter (d) may include one cyan, one yellow, one green, and one magenta sub-pixels.

The RGBW Bayer (e) may include one blue, one red, one green, and one white sub-pixels.

The RGBW #1(f), RGBW #2(g), and RGBW #3(h) may have different color arrays than RGBW Bayer (e) as shown in FIG. 6. The RGBW #1(f) may place the blue, red, green, and white sub-pixels diagonally. The RGBW #2(g) may place two consecutive rows of green, white, red, and white sub-pixels and then two consecutive rows of blue, white, green, and white sub-pixels. The RGBW #3(h) may place a row of green, white, red, and white sub-pixels and then a row of blue, white, green, and white sub-pixels and then repeat the two rows.

Figure 7:
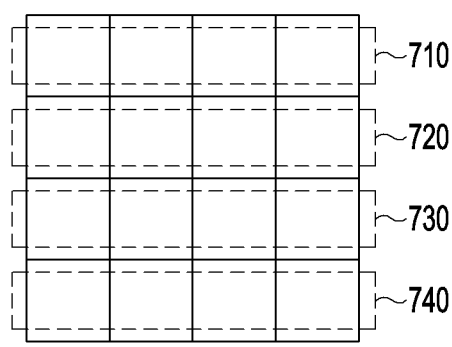
FIG. 7 is a view illustrating an example of segmenting an image into a plurality of blocks by an electronic device, according to an embodiment.

FIG. 7 is a view illustrating an example of segmenting an image into a plurality of blocks by an electronic device, according to an embodiment. According to an embodiment, the electronic device 101 may segment an image obtained by the image sensor 230 into a plurality of blocks and process the plurality of blocks. For example, the electronic device 101 may compress the plurality of blocks on a per block basis. Referring to FIG. 7, the image 700 obtained by the image sensor 230 may be segmented into four blocks. The first block 710 may be the first row of the image 700. The second block 720, the third block 730, and the fourth block 740, respectively, may be the second, third, and fourth rows of the image 700. According to an embodiment, the encoder 212 of the electronic device 101 may receive the image as blocks from the image sensor 230 and compress each block. According to an embodiment, for the first image and second image sequentially obtained by the image sensor 230, when the first block of the first image is the first block 710 of FIG. 7, the first block in the second image may be the first row of the second image. According to an embodiment, the image 700 may be a Bayer image, and the blocks may be segmented corresponding to each row of the Bayer image. In the instant embodiment, the first block and the second block adjacent thereto in the image 700 may have different color configurations. When the Bayer image 700 is compressed in rows or blocks as shown, the row immediately above may not have the same color configuration. For example, the first row has the same color configuration as the third row, and the second row that is positioned adjacent to the third row. Thus, the second row may have a different color configuration from the third row. Thus, referring to the compression information of the first row while compressing the third row may create compression errors due to the distance between the first and third rows. Similarly, compressing the third row by referring to the compression information of the neighboring second row may deteriorate the compression ratio due to the reduced association (e.g. different color configuration) between the second row and the third row. According to an embodiment, to remedy this error, in one or more embodiments of the present disclosure, to compress the first Bayer image and the second Bayer image continuously obtained by the image sensor 230, the electronic device 101 may compress a block in the second Bayer image according to the compression property identified by the compression information of a block in the first Bayer image, where the blocks correspond to each other (e.g. the first block in the second Bayer image and the first block in the first Bayer image). Thus, compression performance is enhanced.

Figure 8:
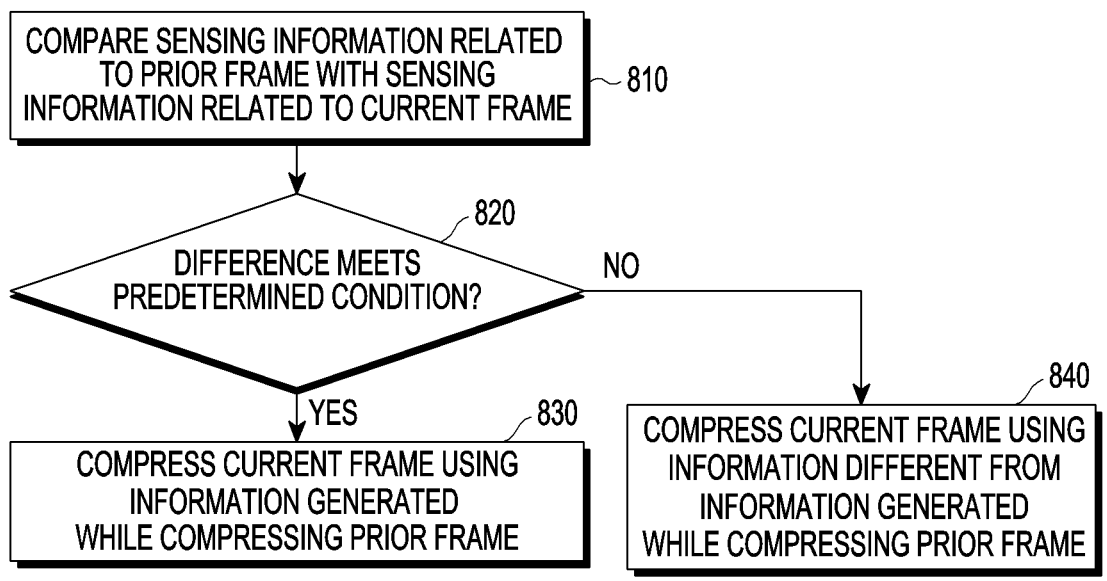
FIG. 8 is a flowchart illustrating a method for compressing, by an electronic device, an image according to sensing information from an image sensor, according to an embodiment.

FIG. 8 is a flowchart illustrating a method, by an electronic device, for compressing an image according to sensing information from an image sensor, according to an embodiment. According to an embodiment, an electronic device (e.g., the electronic device 101 or the control circuit 210 of FIG. 2) may sequentially compress the prior frame and current frame continuously obtained by the image sensor.

In operation 810, the control circuit 210 may compare sensing information related to the prior frame with sensing information related to the current frame. For example, the control circuit 210 may make a comparison as to the difference between the exposure time when the prior frame was captured and the exposure time when the current frame was captured.

In operation 820, the control circuit 210 may identify whether the difference between the sensing information related to the prior frame and the sensing information related to the current frame meets a predetermined condition. The control circuit 210 may identify whether there is a scene change based on whether the predetermined condition is met.

In operation 830, when the difference between the sensing information related to the prior frame and the sensing information related to the current frame meets the predetermined condition, the control circuit 210 may identify that there is no scene change and compress the current frame by using the information generated while compressing the prior frame. For example, the control circuit 210 may identify the first compression property based on the information generated while compressing the prior frame and compress the current frame according to the first compression property.

In operation 840, when the difference between the sensing information related to the prior frame and the sensing information related to the current frame does not meet the predetermined condition, the control circuit 210 may identify that there is a scene change and compress the current frame by using information different from the information generated while compressing the prior frame. For example, the control circuit 210 may compress the current frame according to a second compression property different from the first compression property.

Figure 9:
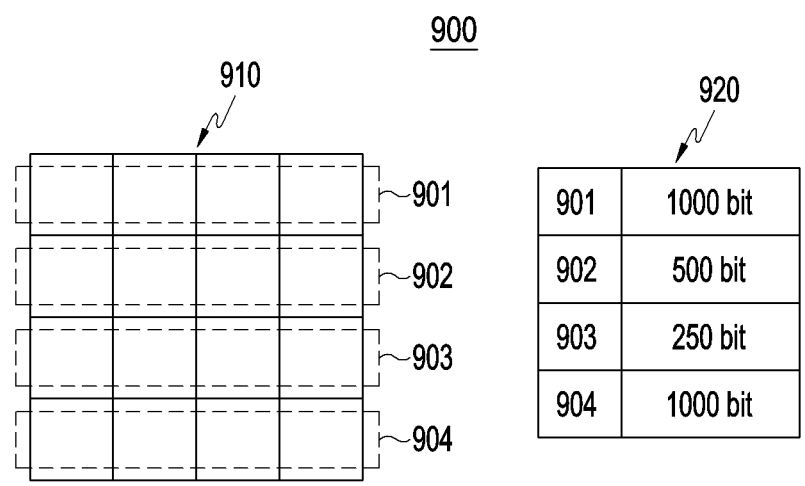
FIG. 9 is a view illustrating an example of generating, by an electronic device, compression loss data per block while compressing an image, according to an embodiment.

FIG. 9 is a view illustrating an example of generating, by an electronic device, compression loss data 900 per block while compressing an image, according to an embodiment. According to an embodiment, the electronic device 101 may segment the image obtained by the image sensor 230 into a plurality of blocks and compress the image in block units. The electronic device 101 may segment the image 910 obtained by the image sensor 230 into a first block 901, a second block 902, a third block 903, and a fourth block 904. The electronic device 101 may generate compression loss data 920 about each block while compressing the image 910. For example, while the electronic device 101 compresses the first block 901, a compression loss of 1000 bits may be caused on the first block 901, and the electronic device 101 may generate information indicating that the compression loss data for the first block 901 is 1000 bits. As an example, the first block, the second block, the third block, and the fourth block of the image 910 may be subject to compression loss such as 1000 bits, 500 bits, 250 bits, and 1000 bits, respectively. Higher compression loss data may indicate higher complexity of the corresponding block. The compression efficiency may be increased by allocating an appropriate bit budget according to the block complexity.

According to an embodiment, the electronic device 101 may identify a compression property that reflects the compression loss data ratio, 4:2:1:4, of the image 910. Upon compressing another image (e.g., the next frame) similar to the image 910, the electronic device 101 may use the identified compression property that reflects the above compression loss data ratio. For example, the electronic device 101 may allocate bits to the blocks of the similar image to the image 910 in the ratio of 4:2:1:4.

Figure 10:
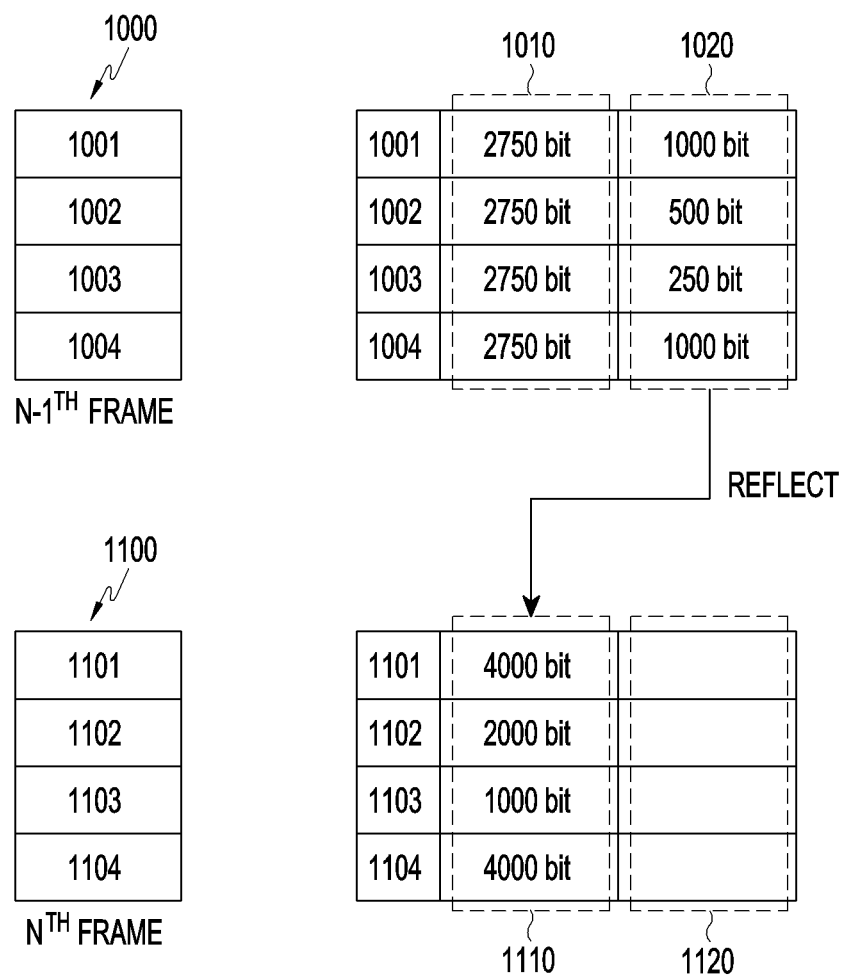
FIG. 10 is a concept view illustrating a method for compressing, by an electronic device, an Nth frame using compression loss data of an N−1th frame, according to an embodiment.

FIG. 10 is a concept view illustrating a method for compressing, by an electronic device, an Nth frame using compression loss data of an N−1th frame, according to an embodiment. According to an embodiment, the electronic device 101 may sequentially compress the N−1th frame 1000 and the Nth frame 1100 continuously obtained by the image sensor 230. According to an embodiment, when the electronic device 101 identifies that there is no scene change between the N−1th frame 1000 and the Nth frame 1100, the electronic device 101 may compress the Nth frame 1100 by using the complexity information of each block of the N−1th frame. The per-block complexity information of the N−1th frame 1000 may be identified based on the compression loss data generated while compressing the N−1th frame 1000.

According to an embodiment, the electronic device 101 may segment the N−1th frame 1000 into a plurality of blocks and use the compression property information 1010 to sequentially compress the plurality of blocks. The compression property information 1010 may be, for example, a bit budget. For example, the electronic device 101 may segment the N−1th frame 1000 into a first block 1001 through a fourth block 1004 and sequentially compress the first block 1001 through the fourth block 1004 according to the compression property information 1010 while generating compression loss data 1020 about each block. For example, when the overall bit amount available for compressing each frame is 11,000, the compression property information 1010 for the N−1th frame may evenly allocate the bits to the blocks, such that 2,750 bits are available for each block. The compression loss data generated from the first block 1001 while compressing the first block 1001 using 2750 bits may be 1000 bits. After compressing the N−1th frame and before compressing the Nth frame, the electronic device 101 may decide whether to compress the Nth frame using information (e.g., compression loss data) generated while compressing the N−1th frame, for example, when it is determined that there is no scene change between the N−1th and Nth frames. The electronic device 101 may generate compression property information 1110 that reflects the compression loss data ratio for each block of the N−1th frame 1000. The compression property information 1110 for the Nth frame may contain information indicating that a different number of bits are allocated to each block of the Nth frame according to the compression loss data ratio of the N−1th frame. For example, according to the compression property information 1110, 4000 bits, 2000 bits, 1000 bits, and 4000 bits may be allocated to the first block 1101, second block 1102, third block 1103, and fourth block 1104, respectively, of the Nth frame. The electronic device 101 may compress the Nth frame 1100 according to the compression property information 1110 and may generate compression loss data 1120 for each block while compressing each block of the Nth frame 1100.

Figure 11:
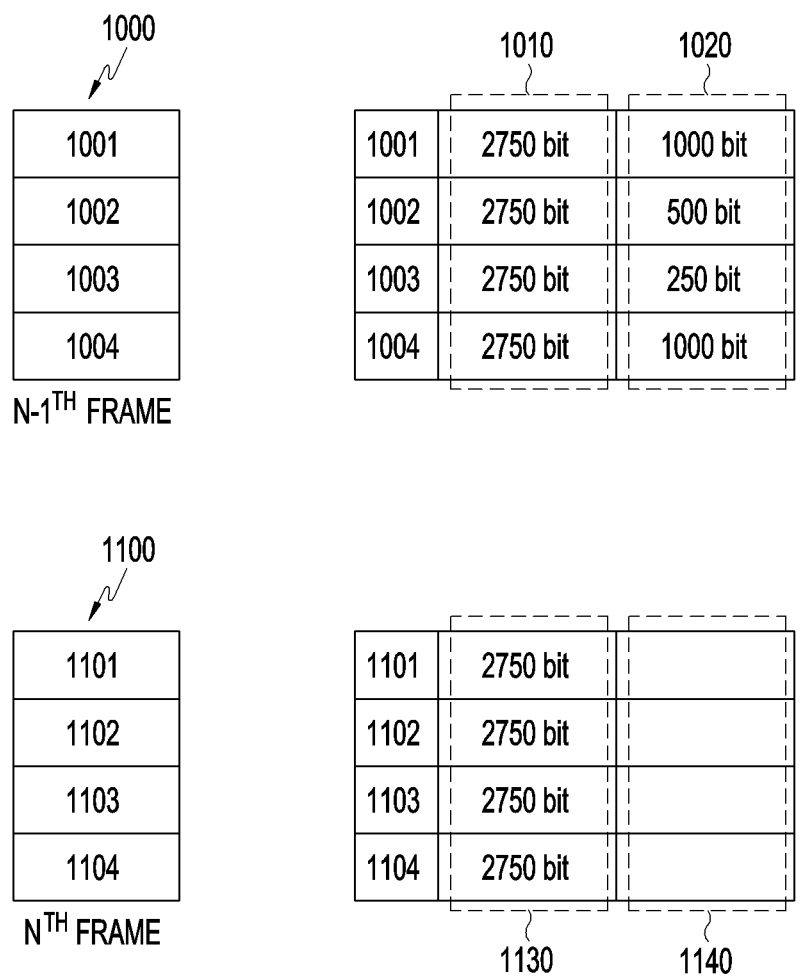
FIG. 11 is a concept view illustrating a method for compressing, by an electronic device, an Nth frame regardless of compression loss data of an N−1th frame, according to an embodiment.

FIG. 11 is a concept view illustrating a method for compressing, by an electronic device, an Nth frame regardless of compression loss data of an N−1th frame, according to an embodiment. According to an embodiment, the electronic device 101 may sequentially compress the N−1th frame 1000 and the Nth frame 1100 continuously obtained by the image sensor 230. According to an embodiment, upon identifying that there is a scene change between the N−1th frame 1000 and the Nth frame 1100, the electronic device 101 may compress the Nth frame 1100 without considering the complexity information or the compression loss data of the N−1th frame 1000. For example, the electronic device 101 may evenly allocate all the 11,000 bits, which are available for compressing the Nth frame 1100, to each block of the Nth frame 1100, without considering the per-block compression loss data 1020 generated while compressing the N−1th frame 1000. The electronic device 101 may compress the Nth frame 1100 according to the compression property information 1130 and may generate compression loss data 1140 for each block while compressing each block of the Nth frame 1100.

Figure 12:
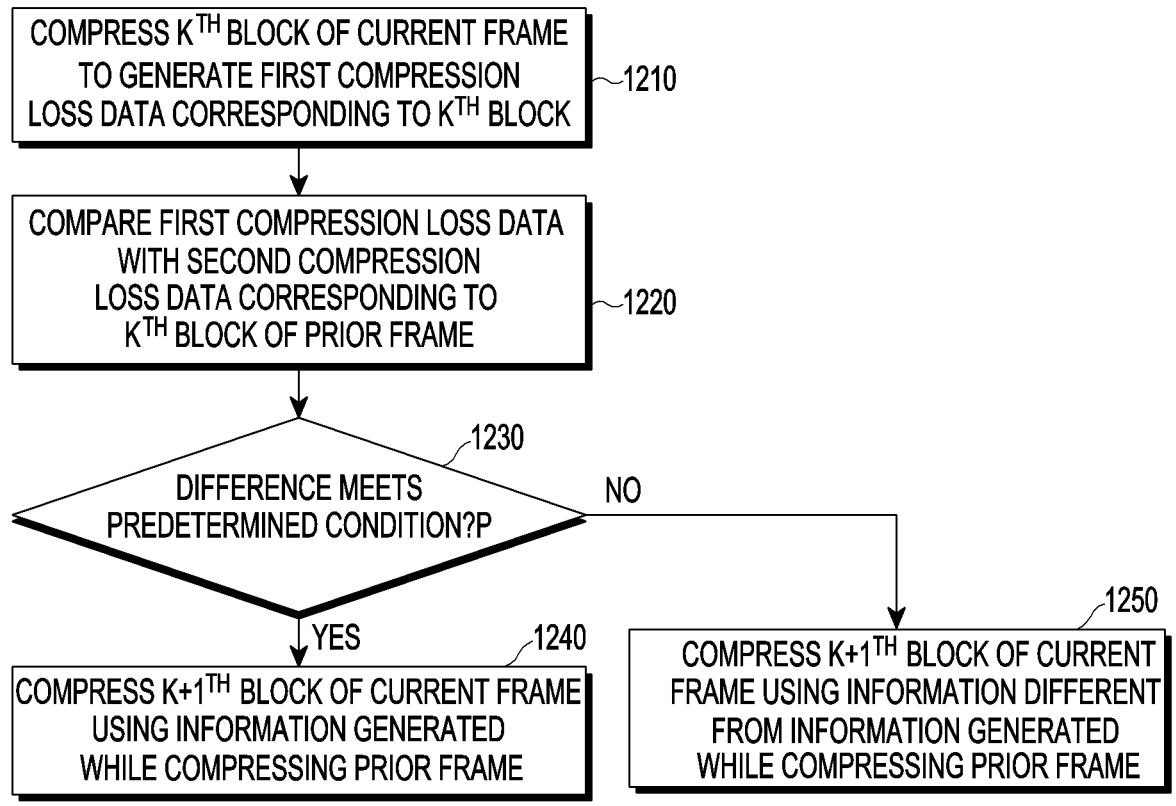
FIG. 12 is a flowchart illustrating a method for segmenting, by an electronic device, an image into a plurality of blocks and compressing them, according to an embodiment.

FIG. 12 is a flowchart illustrating a method for segmenting, by an electronic device, an image into a plurality of blocks and compressing them, according to an embodiment. According to an embodiment, an electronic device (e.g., the electronic device 101 or the control circuit 210 of FIG. 2) may sequentially compress the prior frame and current frame continuously obtained by the image sensor. The control circuit 210 may segment the prior frame and the current frame into a plurality of blocks and compress each of them.

In operation 1210, the control circuit 210 may compress the kth frame of the current frame and generate first compression loss data corresponding to the kth block.

In operation 1220, the control circuit 210 may compare the first compression loss data with second compression loss data corresponding to the kth block of the prior frame.

In operation 1230, the control circuit 210 may identify whether the difference between the first compression loss data and the second compression loss data corresponding to the kth block of the prior frame meets a predetermined condition.

In operation 1240, when the difference between the first compression loss data and the second compression loss data corresponding to the kth block of the prior frame meets the predetermined condition, the control circuit 210 may identify that the prior frame is similar to the current frame and compress the k+1th block of the current frame by using the information generated while compressing the k+1th block of the prior frame. For example, the control circuit 210 may identify first compression property based on per-block compression loss data while compressing the prior frame and compress the k+1th frame of the current frame according to the first compression property.

In operation 1250, when the difference between the first compression loss data and the second compression loss data corresponding to the kth block of the prior frame does not meet the predetermined condition, the control circuit 210 may identify that the prior frame is not similar to the current frame and compress the k+1th block of the current frame by using information different from the information generated while compressing the prior frame. For example, the control circuit 210 may compress the k+1th frame of the current frame according to a second compression property different from the first compression property.

Figure 13:
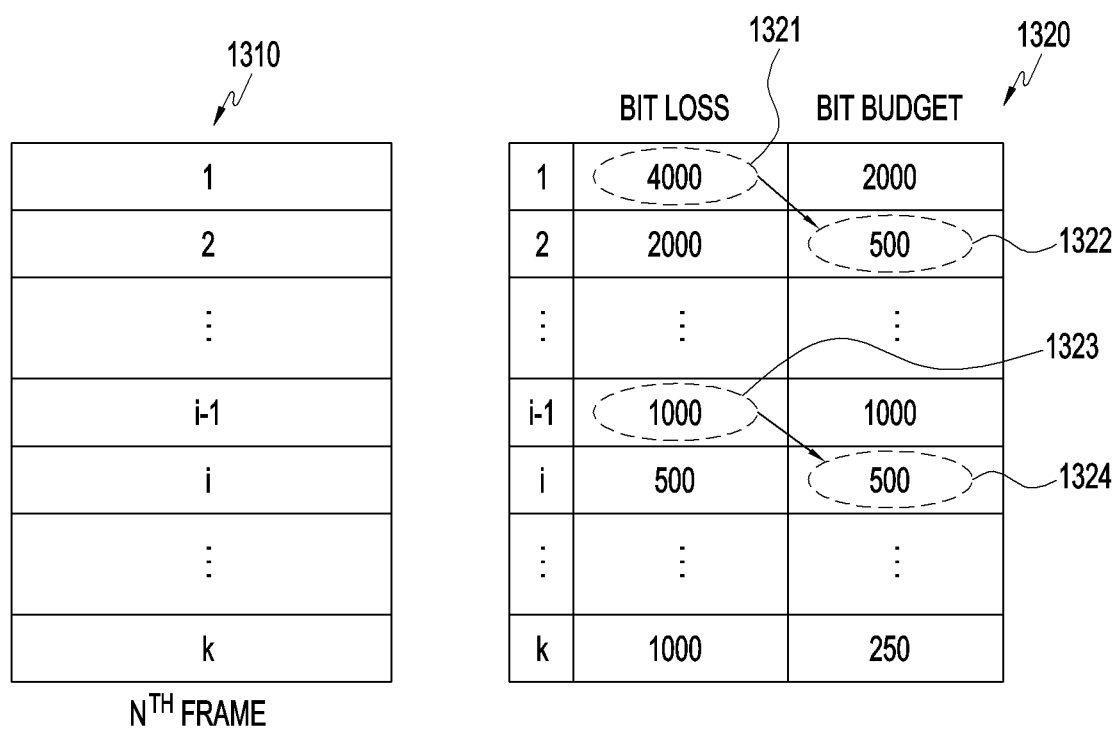
FIG. 13 is a concept view illustrating a method for segmenting, by an electronic device, an image into a plurality of blocks and compressing a current block according to compression-related information of a previously-compressed block, according to an embodiment.

FIG. 13 is a concept view illustrating a method for segmenting, by an electronic device, an image into a plurality of blocks and compressing a current block according to compression-related information of a previously-compressed block, according to an embodiment. According to an embodiment, the electronic device 101 may segment an Nth frame obtained by an image sensor into a plurality of blocks and sequentially compress the plurality of blocks. The electronic device 101 may segment the Nth frame 1310 into k blocks. The electronic device 101 may identify how many bits are to be used to dynamically compress each block, while sequentially compressing each block. Referring to FIG. 13, the electronic device 101 may generate the bit budget allocated to each block to compress the Nth frame 1310 and information 1321 about the bit loss, generated while compressing each block. For example, 2000 bits may be allocated to compress the first block of the Nth frame 1310, and after compression, 4000 bits may be lost. After compressing the first block and before the second block, the electronic device 101 may compare the number of bits lost in the first block with the number of bits lost in the first block of the prior frame (N−1th frame) obtained by the image sensor. When the difference is less than a predetermined threshold, the electronic device 101 may identify that there is no scene change between the N−1th frame and the Nth frame and that the two frames are similar to each other. Thus, the electronic device 101 may identify whether the Nth frame and the N−1th frame are similar in complexity to each other by using the result of compression of the first block of the Nth frame. And when the N−1th frame and the Nth frame are identified to be similar to each other, the electronic device 101 may apply the compression property information, which is based on the number of bits lost per block in the N−1th frame, to the compression of the Nth frame. The bit budget 1322 of the second block of the Nth frame may reflect the bit loss 1321 in the first block. For consecutive blocks of the Nth frame 1310, e.g., an i−1th block and an ith block, the electronic device 101 may identify whether the Nth frame 1310 is similar to the N−1th frame by using the bit loss 1323, may identify the bit budget 1324 for compressing the ith block according to the result of identification. For example, when the Nth frame 1310 is similar to the N−1th frame, the number of bits for compressing the ith block of the Nth frame may reflect the bit loss generated while compressing the ith block in the N−1th frame. But if the Nth frame 1310 is not similar to the N−1th frame, the electronic device 101 may identify the number of bits for compressing the ith block according to a predetermined compression property without considering the result of compression of the N−1th frame.

Figure 14:
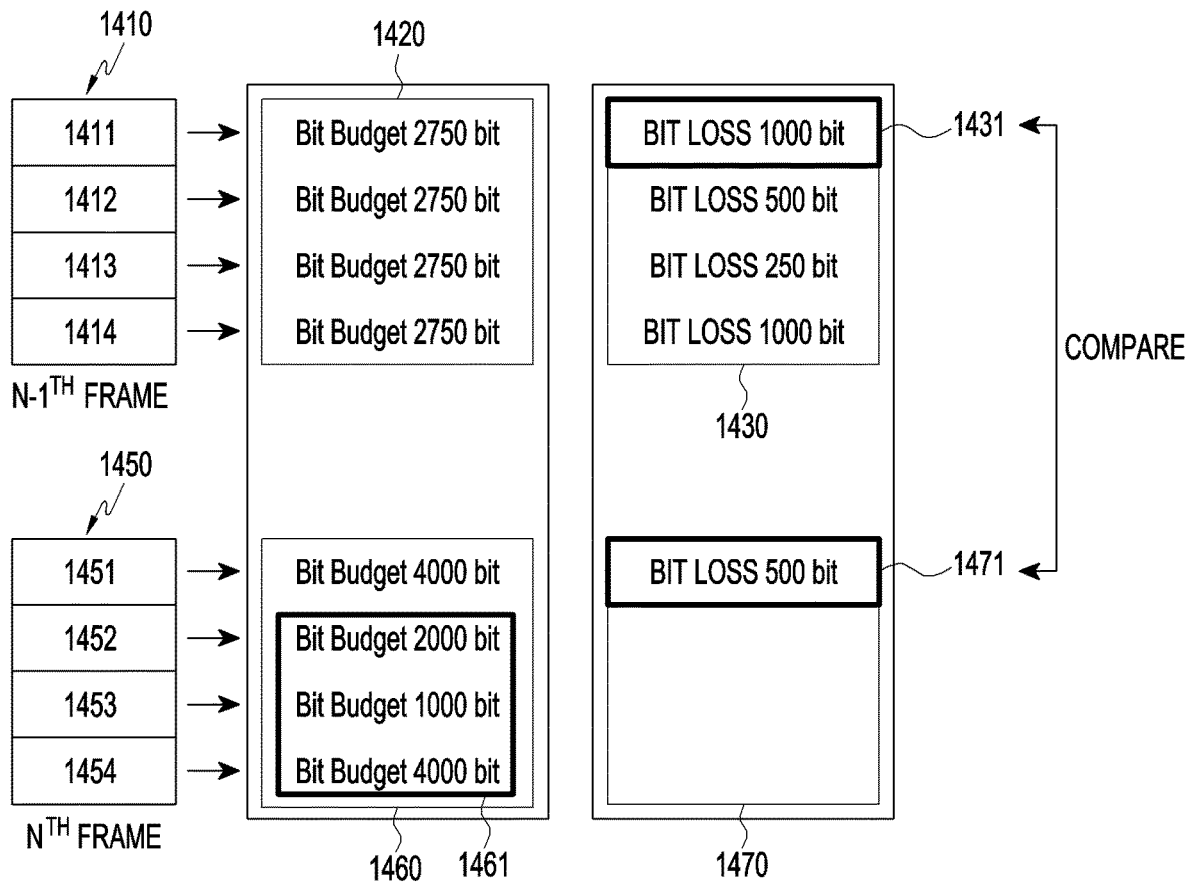
FIG. 14 is a concept view illustrating a method for comparing, by an electronic device, compression information of a block compressed in a current frame and compression information of a prior frame upon segmenting the current frame into a plurality of blocks, according to an embodiment.
Figure 15A:
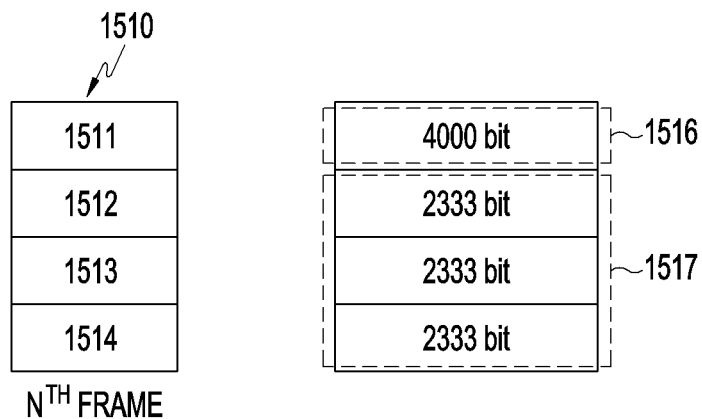
FIG. 15A, FIG. 15B, and FIG. 15C are concept views illustrating methods for dynamically varying, by an electronic device, compression property information while compressing frames, according to an embodiment.
Figure 15B:
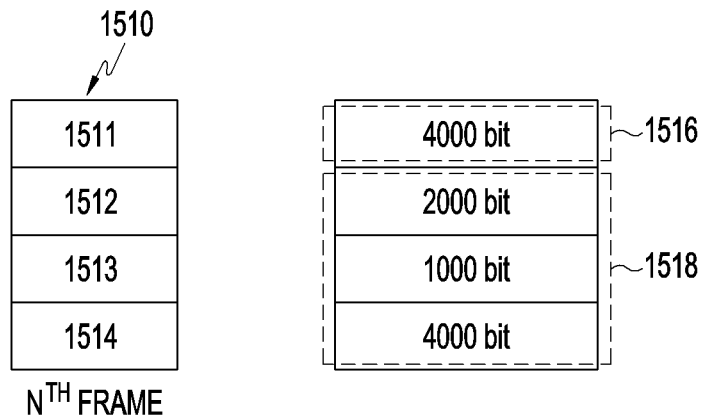
Figure 15C:
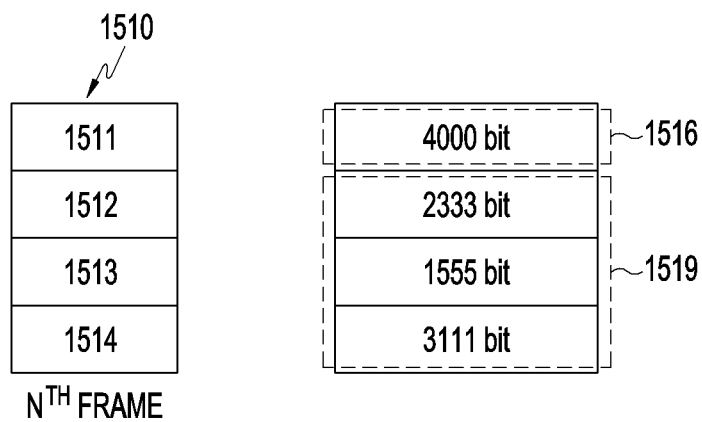

FIG. 14 is a concept view illustrating a method for comparing, by an electronic device, compression information of a block compressed in a current frame and compression information of a prior frame upon segmenting the current frame into a plurality of blocks, according to an embodiment. According to an embodiment, the electronic device 101 may segment the N−1th frame 1410 into a plurality of blocks and compress each block according to compression property information 1420 while generating information 1430 about the number of bits lost for each of the plurality of blocks. The electronic device 101 may identify whether the Nth frame is similar to the N−1th frame while compressing the Nth frame. Referring to FIG. 14, 500 bits may be lost when the electronic device 101 compresses the first block 1451 of the Nth frame according to the compression property information 1460. The electronic device 101 may store the 500 lost bits 1471 corresponding to the first block 1451 in per-block bit count information 1470. To identify whether the N−1th frame 1410 is similar to the Nth frame 1450, the electronic device 101 may compare the bit loss 1431 in the first block 1411 of the N−1th frame 1410 with the bit loss 1471 in the first block 1451 of the Nth frame 1450. When the difference between the bit loss 1431 and the bit loss 1471 is larger than a predetermined threshold, the electronic device 101 may identify that the similarity between the N–1th frame 1410 and the Nth frame 1450 is low. For example, it may be identified that there is a scene change between the N–1th frame 1410 and the Nth frame 1450. Since the N–1th frame 1410 is not similar to the Nth frame 1450, the electronic device 101 may not use the complexity information of the N–1th frame 1410 to compress the Nth frame 1450. According to an embodiment, when the difference between the bit loss 1431 and the bit loss 1471 is equal to or smaller than the predetermined threshold, the electronic device 101 may identify that the N–1th frame 1410 is similar to the Nth frame 1450 and may use the N–1th frame 1410 to compress the Nth frame 1450. Accordingly, after compressing the first block 1451 of the Nth frame 1450, the electronic device 101 may dynamically alter the compression property information 1461 of the blocks 1452, 1453, and 1454 subsequent to the first block 1451 of the Nth frame 1450. FIGS. 15A to 15C illustrate various methods for altering the compression property information 1461 of the subsequent blocks after compressing the first block of the Nth frame 1450.

FIGS. 15A, 15B, and 15C are concept views illustrating methods for dynamically varying, by an electronic device, compression property information while compressing frames, according to an embodiment. According to an embodiment, the electronic device 101 may compress the N–1th frame and the Nth frame continuously obtained by the image sensor and compress the Nth frame by selectively using the information resulting from compressing the N–1th frame. The electronic device 101 may sequentially compress the blocks in the Nth frame 1510 according to the compression property information 1516 and 1517. The electronic device 101, after compressing the first block 1511 of the Nth frame, may alter the compression property information 1517 of the next blocks 1512 to 1514. Referring to FIG. 15A, when the total number of bits allocated is 11,000, and when 4,000 bits are used for the first block, the electronic device 101 may reallocate the remaining 7,000 to the remaining blocks. For example, referring to FIG. 14, upon identifying that the similarity between the N–1th frame and the Nth frame is not similar to each other based on the result of compression of the first block of the Nth frame 1450, the electronic device 101 may determine that the complexity information of the N–1th frame should not be used in compressing the Nth frame. Then, the electronic device 101 may evenly allocate the remaining 7,000 bits to the remaining blocks, i.e., allocate 2,333 bits to each remaining block, thereby altering the compression property information 1517. Referring to FIG. 15B, upon identifying that the N–1th frame and the Nth frame are similar to each other based on the result of compression of the first block of the Nth frame 1450, the electronic device 101 may determine that the complexity information of the N–1th frame may be used in compressing the Nth frame. In this case, the electronic device 101 may apply the compression property information 1461 of FIG. 14, which reflects the complexity information of the N–1th frame to the remaining blocks of the Nth frame. Referring to FIG. 15C, in another embodiment, upon identifying that the N–1th frame and the Nth frame is not similar to each other based on the result of compression of the first block of the Nth frame 1450, the electronic device 101 may partially adjust the compression property information 1461 and generate the compression property information 1519 for the remaining blocks. For example, the electronic device 101 may reduce the ratio differences between the blocks in the compression property information 1461 by half, such that the compression property information 1519 is adjusted into 2,333 bits, 1,555 bits, and 3,111 bits.

Figure 16:
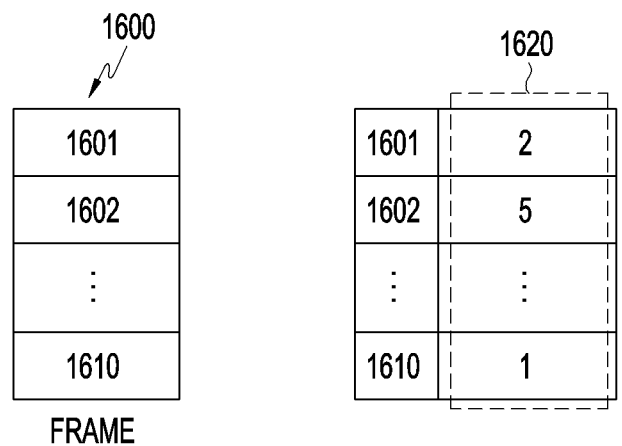
FIG. 16 is a view illustrating an example of generating, by an electronic device, per-image block brightness information while compressing an image, according to an embodiment.

FIG. 16 is a view illustrating an example of generating, by an electronic device, per-image block brightness information while compressing an image, according to an embodiment. According to an embodiment, the electronic device 101 may compress an image obtained by an image sensor and generate compression-related information during compression. Referring to FIG. 16, the electronic device 101 may segment the frame 1600 obtained by the image sensor into a plurality of blocks and compress them. The electronic device 101 may generate brightness information 1620 per block while compressing the frame 1600. For example, the electronic device 101 may generate the brightness information indicating that the first block 1601, second block 1602, and tenth block 1610 of the frame 1600 have a brightness of 2, a brightness of 5, and a brightness of 1, on a scale of 1 to 10, respectively. According to an embodiment, the electronic device 101 may identify a compression property based on the brightness information of the frame 1600. A portion or block relatively brighter in an image may be less sensitive to compression, while another portion relatively darker in the image may be more sensitive to compression. Accordingly, the electronic device 101 may allocate more bits available for compression to blocks identified as relatively darker. In this case, higher-quality compression images may be obtained at the same compression efficiency.

Figure 17:
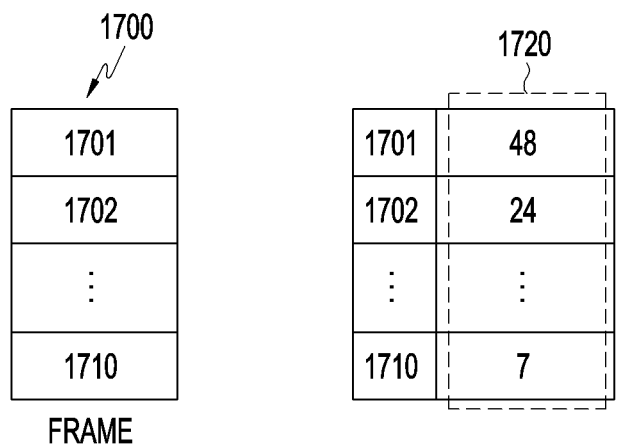
FIG. 17 is a view illustrating an example of generating, by an electronic device, per-image block edge information while compressing an image, according to an embodiment.

FIG. 17 is a view illustrating an example of generating, by an electronic device, per-image block edge information while compressing an image, according to an embodiment. According to an embodiment, the electronic device 101 may segment a frame 1700 obtained by an image sensor into a plurality of blocks and generate edge information 1720 corresponding to each block while compressing the plurality of blocks. For example, the electronic device 101 may generate the number of edges in each block as edge information of the block. Referring to FIG. 17, the electronic device 101 may generate edge information indicating that the first block of the frame 1700 has 48 edges, the second block has 24 edges, and the tenth block has seven edges. According to an embodiment, the electronic device 101 may identify a compression property according to the edge information of the frame 1600. The electronic device 101 may identify that the more edges an area has, the more complex it is. The electronic device 101 may allocate more bits available for compression to blocks identified as having more edges. In this case, higher-quality compression images may be obtained at the same compression efficiency.

Figure 18:
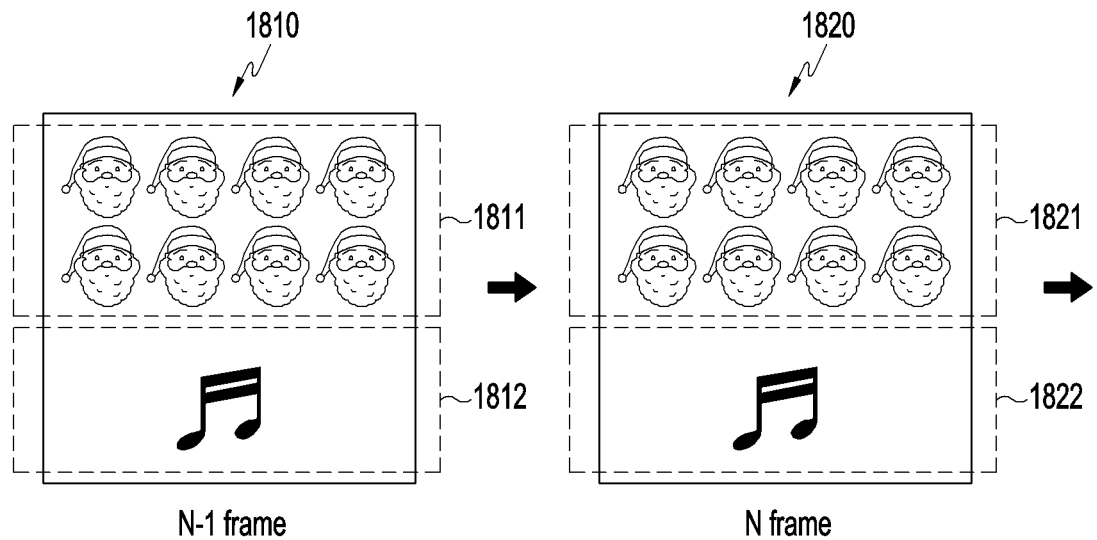
FIG. 18 is a concept view illustrating the quality of an image compressed where an electronic device sequentially compresses two identical images, according to an embodiment.

FIG. 18 is a concept view illustrating the quality of an image compressed when an electronic device sequentially compresses two identical images, according to an embodiment. According to an embodiment, the electronic device 101 may continuously compress an N–1th frame 1810 and an Nth frame 1820. Referring to FIG. 18, the N–1th frame 1810 and the Nth frame 1820 may be the same image. The electronic device 101 may segment the N–1th frame 1810 into a first block 1811 and a second block 1812 and compress each block. The electronic device 101 may compress the first block 1811 and generate first compression loss data corresponding to the first block 1811, and the electronic device 101 may compress the second block 1812 and generate second compression loss data corresponding to the second block 1812. The electronic device 101 may segment a third block 1821 and a fourth block 1822 that respectively correspond to the first block 1811 and the second block 1812 and compress them. The electronic device 101 may compress the third block 1821 according to a compression property generated based on the first compression loss data generated while compressing the N−1th frame 1810. The electronic device 101 may generate third compression loss data corresponding to the third block 1821 while compressing the third block 1821. The electronic device 101 may identify the difference between the third compression loss data and the first compression loss data before compressing the fourth block 1822. Since the N−1th frame 1810 is the same as the Nth frame 1820, the third compression loss data may be the same as the first compression loss data. The electronic device 101 may identify that the N−1th frame 1810 is similar to the Nth frame 1820 based on there being no difference between the third compression loss data and the first compression loss data and may compress the fourth block with a compression property generated based on the second compression loss data which is compression information of the N−1th frame 1810. Accordingly, compression efficiency may be improved.

Figure 19:
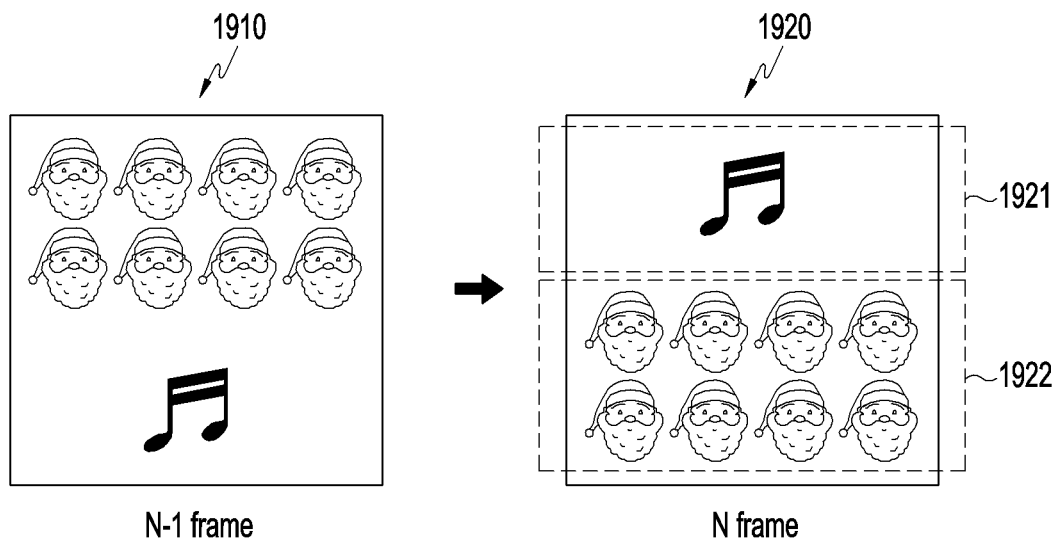
FIG. 19 is a concept view illustrating the quality of an image compressed where an electronic device sequentially compresses two different images, according to an embodiment.

FIG. 19 is a concept view illustrating the quality of an image compressed when an electronic device sequentially compresses two different images, according to an embodiment. According to an embodiment, the electronic device 101 may compress an N−1th frame 1910 and an Nth frame 1920 which are different from each other, unlike in the scenario shown in FIG. 18. The electronic device 101 may segment the Nth frame 1920 into a first block 1921 and a second block 1922 and compress them. The electronic device 101 may compress the first block 1921 according to a compression property generated based on compression loss data generated while compressing the N−1th frame 1910. After compressing the first block 1921, the electronic device 101 may compare the compression loss data generated while compressing the first block with the compression loss data of the block in the N−1th frame corresponding to the position of the first block 1921 and identify that the N−1th frame 1910 is different from the Nth frame 1920. The electronic device 101 may compress the second block 1922 with a compression property different from the compression property generated based on the compression loss data generated while compressing the N−1th frame 1910. As shown in FIGS. 18-19, the electronic device 101 compresses each block of the Nth frame by selectively using the compression loss data generated while compressing the N−1th frame. Therefore, compression efficiency may be improved.

According to an embodiment, an electronic device (e.g., the electronic device 101 of FIG. 1) may comprise a processor (e.g., the processor 120 of FIG. 1), an image sensor (e.g., the image sensor 230 of FIG. 2), and a control circuit (e.g., the control circuit 210 of FIG. 2) operatively connected with the image sensor 230 and connected with the processor 120 via a designated interface, the control circuit 210 configured to obtain a first image and a second image subsequent to the first image using the image sensor 230, segment the first image into a plurality of blocks including a first block and a second block and compress the first image, where in compressing the first image, the control circuit is further configured to generate first compression loss data corresponding to the first block and second compression loss data corresponding to the second block, provide compressed data of the first image corresponding to the first block and the second block to the processor 120 via the designated interface, identify a first compression property based on the first compression loss data and the second compression loss data, segment the second image into a plurality of blocks including a third block and a fourth block that respectively correspond to the first block and the second block and compress the second image, where in compressing the second image, the control circuit is further configured to compress the third block according to the first compression property, generate third compression loss data corresponding to the third block, when a difference between the first compression loss data and the third compression loss data meets a first predetermined condition, compress the fourth block according to the first compression property, and when the difference between the first compression loss data and the third compression loss data meets a second predetermined condition, compress the fourth block according to a second compression property different from the first compression property, and provide compressed data of the second image corresponding to the third block and the fourth block to the processor 120 via the designated interface. According to an embodiment, the first compression property may include information on bits allocated to compress the first image and a compression loss data size ratio corresponding to the plurality of blocks of the first image. The control circuit 210 may be further configured to, as part of compressing the third block according to the first compression property, compress the third block according to bits allocated in proportion to the first compression loss data, and as part of compressing the fourth block according to the first compression property, compress the fourth block according to bits allocated in proportion to the second compression loss data. According to an embodiment, the second compression property may include information on bits evenly allocated to each of the plurality of blocks of the first image from bits allocated to compress the first image. The control circuit 210 may be further configured to, as part of compressing the fourth block according to the second compression property, compress the fourth block according to the bits evenly allocated. According to an embodiment, the second compression property may include bit count information resulting from adjusting the bits even allocated based on a compression loss data size ratio corresponding to the plurality of blocks of the first image. The control circuit 210 may be further configured to, as part of compressing the fourth block according to the second compression property, compress the fourth block according to the adjusted bits. According to an embodiment, the control circuit 210 may receive sensing information related to the second image from the image sensor 230. The control circuit 210 may be further configured to, as part of compressing the third block, identify the difference between the first image and the second image based on the sensing information, select one of the first compression property or the second compression property based on the difference meeting the first predetermined condition or the second predetermined condition, and compress the third block according to the selected one of the first compression property or second compression property. According to an embodiment, the sensing information may include at least one of the sensitivity (ISO) of the image sensor 230, exposure time, shutter speed, motion, and image capture-related information. According to an embodiment, the control circuit 210 may be further configured to generate at least one of brightness information of the first block and edge information regarding edges included in the first block while compressing the first block. The first compression property may reflect at least one of the brightness information and the edge information. According to an embodiment, the first compression property may include information about bits allocated to compress the first image and bits allocated according to a brightness corresponding to each of the plurality of blocks of the first image. According to an embodiment, the first compression property may include information about bits allocated to compress the first image and bits allocated according to an edge count in each of the plurality of blocks of the first image.

According to an embodiment, a method for operating an electronic device (e.g., the electronic device 101 of FIG. 1) may comprise obtaining a first image and a second image subsequent to the first image using an image sensor (e.g., the image sensor 230 of FIG. 2), segmenting the first image into a plurality of blocks including a first block and a second block and compressing the first image by a control circuit (e.g., the control circuit 210 of FIG. 2), compressing the first image including generating first compression loss data corresponding to the first block and generating second compression loss data corresponding to the second block, providing compressed data of the first image corresponding to the first block and the second block to a processor (e.g., the processor 120 of FIG. 1) via a designated interface, identifying, by the control circuit, a first compression property based on the first compression loss data and the second compression loss data, segmenting the second image into a plurality of blocks including a third block and a fourth block that respectively correspond to the first block and the second block and compressing the second image by the control circuit, compressing the second image including compressing the third block according to the first compression property, generating third compression loss data corresponding to the third block, when a difference between the first compression loss data and the third compression loss data meets a first predetermined condition, compressing the fourth block according to the first compression property, and when the difference between the first compression loss data and the third compression loss data meets a second predetermined condition, compressing the fourth block according to a second compression property different from the first compression property, and providing the compressed data of the second image corresponding to the third block and the fourth block to the processor 120 via the designated interface.

According to an embodiment, there may be provided a non-transitory computer-readable recording medium retaining a program (e.g., the program 140 of FIG. 1) executed on a computer, wherein the program 140 may comprise executable instructions that, when executed by a processor (e.g., the processor 120 of FIG. 1), enable the processor to obtain a first image and a second image subsequent to the first image using an image sensor (e.g., the image sensor 230 of FIG. 2), segment the first image into a plurality of blocks including a first block and a second block and compress the first image by a control circuit (e.g., the control circuit 210 of FIG. 2), where in compressing the first image, the executable instructions further enable the processor to generate first compression loss data corresponding to the first block and second compression loss data corresponding to the second block, provide compressed data of the first image corresponding to the first block and the second block to the processor 120 via a designated interface (e.g., the interface 177 of FIG. 1), identify, by the control circuit, a first compression property based on the first compression loss data and the second compression loss data, segment the second image into a plurality of blocks including a third block and a fourth block that respectively correspond to the first block and the second block and compress the second image by the control circuit 210, where in compressing the second image, the executable instructions further enable the processor to compress the third block according to the first compression property, generate third compression loss data corresponding to the third block, when a difference between the first compression loss data and the third compression loss data meets a first predetermined condition, compress the fourth block according to the first compression property, and when the difference between the first compression loss data and the third compression loss data meets a second predetermined condition, compress the fourth block according to a second compression property different from the first compression property, and provide the compressed data of the second image corresponding to the third block and the fourth block to the processor 120 via the designated interface 177.

As is apparent from the foregoing description, according to various embodiments, there may be provided an electronic device capable of compressing a second image obtained subsequent to a first image by using compression property information obtained while compressing the first image and a method for operating the electronic device.

According to various embodiments, the electronic device may efficiently compress the current image by selectively using compression property information generated while compressing the prior image, based on whether there is a scene change between the current image and the prior image.

According to various embodiments, the electronic device may identify whether there is a scene change between the current image and the prior image based on sensing information obtained by the image sensor or compression property information generated while compressing the current image and accurately predict the similarity between the current image and the prior image and use the same in the compression of the images.

The embodiments disclosed herein are proposed for description and understanding of the disclosed technology and does not limit the scope of the disclosure. Accordingly, the scope of the disclosure should be interpreted as including all changes or various embodiments based on the technical spirit of the disclosure.

Certain of the above-described embodiments of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein.

What is claimed is:

1. An electronic device, comprising:
a processor;
an image sensor; and
a control circuit operatively connected with the image sensor and connected with the processor via a designated interface, the control circuit configured to:
obtain a first image and a second image subsequent to the first image using the image sensor,
segment the first image into a plurality of blocks including a first block and a second block and compress the first image, wherein in compressing the first image, the control circuit is further configured to generate first compression loss data corresponding to the first block and second compression loss data corresponding to the second block, provide compressed data of the first image corresponding to the first block and the second block to the processor via the designated interface, identify a first compression property based on the first compression loss data and the second compression loss data, segment the second image into a plurality of blocks including a third block and a fourth block that respectively correspond to the first block and the second block and compress the second image, wherein in compressing the second image, the control circuit is further configured to:

compress the third block according to the first compression property, generate third compression loss data corresponding to the third block, when a difference between the first compression loss data and the third compression loss data meets a first predetermined condition, compress the fourth block according to the first compression property, and when the difference between the first compression loss data and the third compression loss data meets a second predetermined condition, compress the fourth block according to a second compression property different from the first compression property, and provide compressed data of the second image corresponding to the third block and the fourth block to the processor via the designated interface.

2. The electronic device of claim 1, wherein the first compression property includes information on bits allocated to compress the first image and a compression loss data size ratio corresponding to the plurality of blocks of the first image, and wherein the control circuit is further configured to, as part of compressing the third block according to the first compression property, compress the third block according to bits allocated in proportion to the first compression loss data, and as part of compressing the fourth block according to the first compression property, compress the fourth block according to bits allocated in proportion to the second compression loss data.

3. The electronic device of claim 1, wherein the second compression property includes information on bits evenly allocated to each of the plurality of blocks of the first image from bits allocated to compress the first image, and wherein the control circuit is further configured to, as part of compressing the fourth block according to the second compression property, compress the fourth block according to the bits evenly allocated.

4. The electronic device of claim 3, wherein the second compression property includes bit count information resulting from adjusting the bits even allocated based on a compression loss data size ratio corresponding to the plurality of blocks of the first image, and wherein the control circuit is further configured to, as part of compressing the fourth block according to the second compression property, compress the fourth block according to the adjusted bits.

5. The electronic device of claim 1, wherein the control circuit is further configured to:

receive sensing information related to the second image from the image sensor; and as part of compressing the third block:

identify a difference between the first image and the second image based on the sensing information, select one of the first compression property or the second compression property based on the difference meeting the first predetermined condition or the second predetermined condition, and compress the third block according to the selected one of the first compression property or the second compression property.

6. The electronic device of claim 5, wherein the sensing information includes at least one of a sensitivity (ISO) of the image sensor, an exposure time, a shutter speed, a motion, or image capture-related information.

7. The electronic device of claim 1, wherein the control circuit is further configured to generate at least one of brightness information of the first block or edge information regarding edges included in the first block while compressing the first block, and wherein the first compression property reflects at least one of the brightness information of the first block or the edge information included in the first block.

8. The electronic device of claim 7, wherein the first compression property includes information about bits allocated to compress the first image and bits allocated according to a brightness corresponding to each of the plurality of blocks of the first image.

9. The electronic device of claim 7, wherein the first compression property includes information about bits allocated to compress the first image and bits allocated according to an edge count in each of the plurality of blocks of the first image.

10. A method for operating an electronic device, the method comprising:

obtaining a first image and a second image subsequent to the first image using an image sensor;

segmenting the first image into a plurality of blocks including a first block and a second block and compressing the first image, wherein the compressing of the first image includes generating first compression loss data corresponding to the first block and generating second compression loss data corresponding to the second block;

providing compressed data of the first image corresponding to the first block and the second block to a processor via a designated interface;

identifying a first compression property based on the first compression loss data and the second compression loss data;

segmenting the second image into a plurality of blocks including a third block and a fourth block that respectively correspond to the first block and the second block and compressing the second image, wherein the compressing of the second image includes:

compressing the third block according to the first compression property, generating third compression loss data corresponding to the third block, when a difference between the first compression loss data and the third compression loss data meets a first predetermined condition, compressing the fourth block according to the first compression property, and when the difference between the first compression loss data and the third compression loss data meets a second predetermined condition, compressing the fourth block according to a second compression property different from the first compression property; and providing compressed data of the second image corresponding to the third block and the fourth block to the processor via the designated interface.

11. The method of claim 10, wherein the first compression property includes information on bits allocated to compress the first image and a compression loss data size ratio corresponding to the plurality of blocks of the first image, and wherein the method further comprises, as part of compressing the third block according to the first compression property, compressing the third block according to bits allocated in proportion to the first compression loss data, and as part of compressing the fourth block according to the first compression property, compressing the fourth block according to bits allocated in proportion to the second compression loss data.

12. The method of claim 10, wherein the second compression property includes information on bits evenly allocated to each of the plurality of blocks of the first image from bits allocated to compress the first image, and wherein the method further comprises, as part of compressing the fourth block according to the second compression property, compressing the fourth block according to the bits evenly allocated.

13. The method of claim 12, wherein the second compression property includes bit count information resulting from adjusting the bits even allocated based on a compression loss data size ratio corresponding to the plurality of blocks of the first image, and wherein the method further comprises, as part of compressing the fourth block according to the second compression property, compressing the fourth block according to the adjusted bits.

14. The method of claim 10, further comprising:
receiving sensing information related to the second image from the image sensor; and
as part of compressing the third block:
identifying a difference between the first image and the second image based on the sensing information,
selecting one of the first compression property or the second compression property based on the difference meeting the first predetermined condition or the second predetermined condition, and
compressing the third block according to the selected one of the first compression property or the second compression property.

15. The method of claim 14, wherein the sensing information includes at least one of a sensitivity of the image sensor, an exposure time, a shutter speed, a motion, or image capture-related information.

16. The method of claim 15, further comprising generating at least one of brightness information of the first block or edge information regarding edges included in the first block while compressing the first block, and wherein the first compression property reflects at least one of the brightness information of the first block or the edge information included in the first block.

17. The method of claim 10, wherein the first compression property includes information about bits allocated to compress the first image and bits allocated according to a brightness corresponding to each of the plurality of blocks of the first image.

18. The method of claim 10, wherein the first compression property includes information about bits allocated to compress the first image and bits allocated according to an edge count in each of the plurality of blocks of the first image.

19. A non-transitory computer-readable recording medium retaining a program executable on a computer, wherein the program comprises executable instructions that, when executed by a processor, enable the processor to:
obtain a first image and a second image subsequent to the first image using an image sensor;
segment the first image into a plurality of blocks including a first block and a second block and compress the first image by a control circuit, wherein in compressing the first image, the executable instructions further enable the processor to generate first compression loss data corresponding to the first block and second compression loss data corresponding to the second block;
provide compressed data of the first image corresponding to the first block and the second block to the processor via a designated interface;
identify, by the control circuit, a first compression property based on the first compression loss data and the second compression loss data;
segment the second image into a plurality of blocks including a third block and a fourth block that respectively correspond to the first block and the second block and compressing the second image by the control circuit, wherein in compressing the second image, the executable instructions further enable the processor to:
compress the third block according to the first compression property,
generate third compression loss data corresponding to the third block, and
when a difference between the first compression loss data and the third compression loss data meets a first predetermined condition, compress the fourth block according to the first compression property, and
when the difference between the first compression loss data and the third compression loss data meets a second predetermined condition, compress the fourth block according to a second compression property different from the first compression property; and
provide compressed data of the second image corresponding to the third block and the fourth block to the processor via the designated interface.

20. The non-transitory computer-readable recording medium of claim 19, wherein the first compression property includes information on bits allocated to compress the first image and a compression loss data size ratio corresponding to the plurality of blocks of the first image, and wherein the program comprises executable instructions that, when executed by the processor, further enable the processor to, as part of compressing the third block according to the first compression property, compress, by the control circuit, the third block according to bits allocated in proportion to the first compression loss data, and as part of compressing the fourth block according to the first compression property, compress, by the control circuit, the fourth block according to bits allocated in proportion to the second compression loss data.

* * * * *